(12) United States Patent
Yang

(10) Patent No.: US 8,749,140 B2
(45) Date of Patent: Jun. 10, 2014

(54) LIGHT EMITTING APPARATUS

(71) Applicant: GIO Optoelectronics Corp., Tainan (TW)

(72) Inventor: Wu-Chang Yang, Tainan (TW)

(73) Assignee: Gio Optoelectronics Corp., Tainan (TW)

( * ) Notice: Subject to any disclaimer, the term of this patent is extended or adjusted under 35 U.S.C. 154(b) by 25 days.

(21) Appl. No.: 13/708,910

(22) Filed: Dec. 7, 2012

(65) Prior Publication Data

US 2013/0147350 A1 Jun. 13, 2013

(30) Foreign Application Priority Data

Dec. 9, 2011 (TW) .............................. 100145618 A

(51) Int. Cl.
*H01J 7/44* (2006.01)

(52) U.S. Cl.
USPC ............................................................ 315/52

(58) Field of Classification Search
USPC ................. 315/52, 119–133, 135, 160, 185 R
See application file for complete search history.

(56) References Cited

U.S. PATENT DOCUMENTS

| 8,508,151 B2 * | 8/2013 | Terazawa ....................... 315/291 |
| 8,537,574 B2 * | 9/2013 | Isogai et al. ............... 363/21.12 |
| 2011/0205770 A1 * | 8/2011 | Isogai et al. .................... 363/78 |
| 2011/0248637 A1 * | 10/2011 | Mitsuyasu et al. ............ 315/178 |
| 2013/0026926 A1 * | 1/2013 | Oh et al. ........................ 315/122 |

FOREIGN PATENT DOCUMENTS

| JP | 2009-517803 A | 4/2009 |
| JP | 2009-259489 A | 11/2009 |
| JP | 2011-503818 A | 1/2011 |
| JP | 2011-40701 A | 2/2011 |
| JP | 2011-134635 A | 7/2011 |
| JP | 2012-79412 A | 4/2012 |

\* cited by examiner

*Primary Examiner* — Thienvu Tran
(74) *Attorney, Agent, or Firm* — Cheng-Ju Chiang

(57) ABSTRACT

A light emitting apparatus receives an external power. A switching unit is electrically connected with a light emitting unit to form a serial circuit. A first electrical connection element is electrically connected with the external power and the light emitting unit. A second electrical connection element is electrically connected with the external power and the switching unit. A sensing unit is electrically connected with the first electrical connection element, the second electrical connection element and the switching unit. When filament currents flow between two electrical input terminals of the first electrical connection element and between two electrical input terminals of the second electrical connection element, the sensing unit controls the switching unit to turn on to enable the light emitting unit to receive the external power and start to emit light. Thus, users can avoid the risk of electric shock when installing the light emitting apparatus.

15 Claims, 17 Drawing Sheets

LIGHT EMITTING APPARATUS

CROSS REFERENCE TO RELATED APPLICATIONS

This Non-provisional application claims priority under 35 U.S.C. §119(a) on Patent Application No(s). 100145618 filed in Taiwan, Republic of China on Dec. 9, 2011, the entire contents of which are hereby incorporated by reference.

BACKGROUND OF THE INVENTION

1. Field of Invention

The present invention relates to a light emitting apparatus and, in particular, to a light emitting apparatus with light emitting diodes (LEDs).

2. Related Art

Recently, the manufacturing processes and materials of the light emitting diode (LED) are continuously improved, so the light emitting efficiency of the LED is also significantly improved. Comparing to the typical fluorescent lamp or power-saving light bulb, the LED has the properties of lower power consumption, lower pollution, longer lifetime, higher safety, shorter light emitting response time and smaller size. Therefore, the LEDs have become widely used in many electronic products and applications. One of the applications is to use the light emitting apparatus of LED to create a lamp having the same shape of a conventional fluorescent lamp and replace the conventional fluorescent lamp on the current lamp base.

FIG. 1 is a schematic illustration showing a conventional light emitting apparatus 1. Referring to FIG. 1, the light emitting apparatus 1 may include a plurality of LEDs (not shown), and the light emitting apparatus 1 can convert the electrical energy into the light energy.

The light emitting apparatus 1 includes a LED lamp 11 (hereinafter referred to as the lamp 11) and a lamp base 12. The lamp 11 includes two electrical connection elements 111 and 112 and a tube body 113. The electrical connection elements 111 and 112 are disposed on two sides of the tube body 113, respectively, and a plurality of LEDs and driving elements thereof (not shown) are disposed in the tube body 113. In addition, the lamp base 12 may include two mounting sets 121 and 122 and a body 123. The mounting sets 121 and 122 are disposed on two ends of the body 123, respectively. The electrical connection elements 111 and 112 of the lamp 11 may be installed in the mounting sets 121 and 122, respectively. Providing an AC power to the light emitting apparatus 1 can light up the lamp 11. During the starting up process, the conventional driving elements generate filament currents flowing between the electrodes of the electrical connection element 111 or 112. After the starting up process, the conventional driving elements will stop outputting the filament currents for decreasing power consumption and preserving filament's lifetime.

However, when the user wants to install the lamp 11 in the lamp base 12, one electrical connection element 111 shown in FIG. 1 is firstly installed in the mounting set 121 on one side, and the user's hands slightly open the mounting set 122 on the other side of the lamp base 12 to install the other electrical connection element 112 onto the mounting set 122. However, while the installer uses his hands to open the other mounting set 122, the external AC power is connected to the electrical connection element 112 on the other side through the lamp base 12, the mounting set 121, the electrical connection element 111 and the internal circuit of the lamp 11 because the electrical connection element 111 has been installed on the mounting set 121 of the lamp base 12. So, when the user inadvertently touches the electrical connection element 112 on one side, there is a risk of electric shock.

Therefore, it is an important subject to provide a light emitting apparatus free from the risk of electric shock upon installation.

SUMMARY OF THE INVENTION

In view of the foregoing subject, an objective of the invention is to provide a light emitting apparatus free from the risk of electric shock during installation.

To achieve the above objective, the present invention discloses a light emitting apparatus, which receives an external power and comprises a light emitting unit, at least one switching unit, a first electrical connection element, a second electrical connection element, and a sensing unit. The switching unit is electrically connected with the light emitting unit to form a serial circuit. The first electrical connection element is electrically connected with the external power and the light emitting unit, and the second electrical connection element is electrically connected with the external power and the switching unit. The sensing unit is electrically connected with the first electrical connection element, the second electrical connection element and the switching unit. When filament currents flow between two electrical input terminals of the first electrical connection element and between two electrical input terminals of the second electrical connection element, the sensing unit controls the switching unit to turn on to enable the light emitting unit to receive the external power and start to emit light.

In one embodiment, when the switching unit turns on, a lamp current generated by the external power flows through a lamp current path formed by the first electrical connection element, the light emitting unit and the second electrical connection element, and then enables the light emitting unit to emit light.

In one embodiment, when the switching unit does not turn on, the lamp current generated by the external power cannot flow through the lamp current path formed by the first electrical connection element, the light emitting unit and the second electrical connection element.

In one embodiment, the light emitting apparatus further comprises a control unit, which is electrically connected with the light emitting unit and controls lighting brightnesses, colors, color temperatures, the number of lighting operations, or a lighting order of a plurality of light emitting diodes (LEDs) of the light emitting unit, or serial-parallel configurations of the LEDs.

In one embodiment, the control unit controls the lighting brightnesses, colors, color temperatures, the number of lighting operations, or the lighting order of the LEDs of the light emitting unit, or serial-parallel configurations of the LEDs according to the number of interruptions of the external power within a specific time.

In one embodiment, the control unit controls the lighting brightnesses, colors, color temperatures, the number of lighting operations, or the lighting order of the LEDs of the light emitting unit, or serial-parallel configurations of the LEDs according to a lamp current flowing through the light emitting unit.

In one embodiment, the light emitting apparatus further comprises a control unit, which is electrically connected with the serial circuit and changes a serial connection impedance between the control unit and the light emitting unit according to a lamp current of the light emitting unit.

In one embodiment, the control unit has a self-latched function for changing the lighting brightnesses, colors, color temperatures, the number of lighting operations, or the lighting order of the LEDs of the light emitting unit, or serial-parallel configurations of the LEDs according to a lamp current flowing through the light emitting unit only once.

In one embodiment, the light emitting apparatus further comprises a signal connection terminal, which is connected with a signal receiver having an input terminal and an output terminal electrically insulated from each other. The signal connection terminal receives a control signal, and the control unit controls the light emitting unit to emit light according to the control signal.

In one embodiment, the control signal is transferred to another light emitting apparatus through the signal connection terminal, and the control unit of another light emitting apparatus controls the light emitting unit thereof according to the control signal.

In one embodiment, the light emitting apparatus further comprises at least one rectifying unit having an output terminal electrically connected with the serial circuit, and the current outputted from the rectifying unit is controlled by the switching unit.

In one embodiment, the rectifying unit further has a first input terminal and a second input terminal. The first electrical connection element is electrically connected with the external power and the first input terminal, and the second electrical connection element is electrically connected with the external power and the second input terminal.

In one embodiment, the light emitting unit comprises at least one AC LED module.

In one embodiment, the switching unit comprises a relay, a transistor or a silicon-controlled rectifier.

In one embodiment, the sensing unit has two sensing elements, which sense whether there are filament currents flowing between the electrical input terminals of the first electrical connection element and between the electrical input terminals of the second electrical connection element, respectively. If yes, the switching unit is turned on.

In one embodiment, the input terminals and output terminals of the sensing elements are electrically insulated from each other.

In one embodiment, when the switching unit turns on to enable the light emitting unit to start to emit light, the switching unit can continuously keep turning on according to a lamp current, a crossover voltage or an emitted light of the light emitting unit, or a lamp current flowing through the switching unit.

In one embodiment, when there are two switching units, the switching units and the light emitting unit are electrically connected in series, and the sensing unit controls the switching units so as to control the light emitting unit to emit light.

In one embodiment, the light emitting apparatus further comprises at least one impedance element electrically connected between the electrical input terminals of the first electrical connection element, or between the electrical input terminals of the second electrical connection element.

In one embodiment, when there are two impedance elements, one of the impedance elements is electrically connected between the electrical input terminals of the first electrical connection element, and the other one of the impedance elements is electrically connected between the electrical input terminals of the second electrical connection element.

In one embodiment, the impedance element is a resistor, an inductor, a capacitor, a diode, at least one AC LED module, or a combination thereof.

In one embodiment, the electrical input terminals of the first electrical connection element and the second electrical connection element match with a lamp holder of a fluorescent lamp.

In one embodiment, the first electrical connection element and the second electrical connection element are disposed at two opposite ends of the light emitting unit.

In one embodiment, the default state of the switching unit is OFF.

As mentioned above, the light emitting apparatus according to the invention utilizes the sensing unit to sense the filament currents flowing between two electrical input terminals of the first electrical connection element and between two electrical input terminals of the second electrical connection element, and then controls the switching unit to turn on and enable the light emitting unit to start to emit light. Thus, when the user only installs the first electrical connection element in the lamp holder, the sensing unit cannot turn on the switching unit, so the lamp current generated by the external power cannot flow through the lamp current path formed by the first electrical connection element, the light emitting unit and the second electrical connection element, and there is no risk of generating the electric shock when the user inadvertently touches the second electrical connection element. As a result, the light emitting apparatus of the invention is free from the risk of electric shock during installation.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
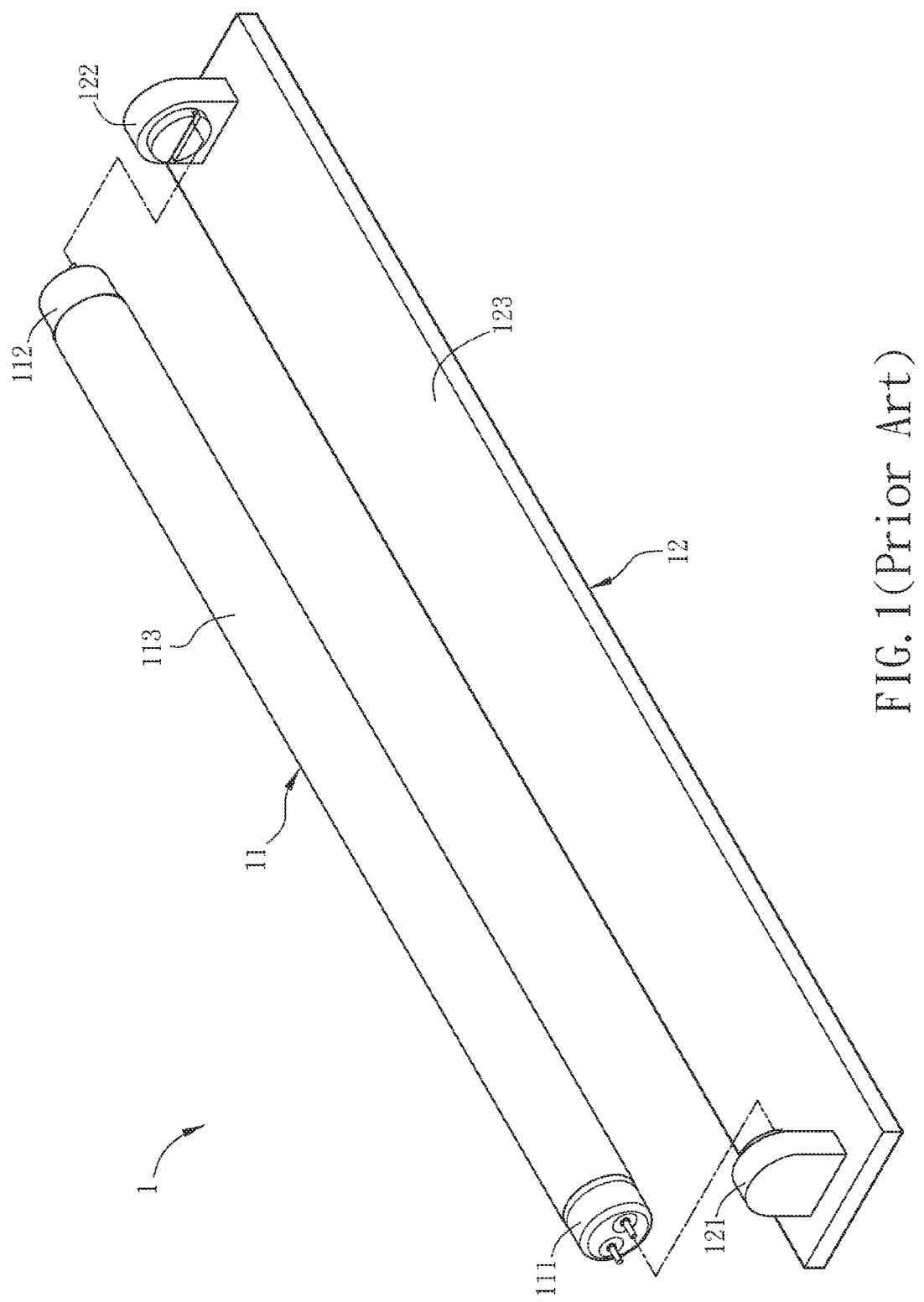
FIG. 1 is a schematic illustration showing a conventional light emitting apparatus.
Figure 2A:
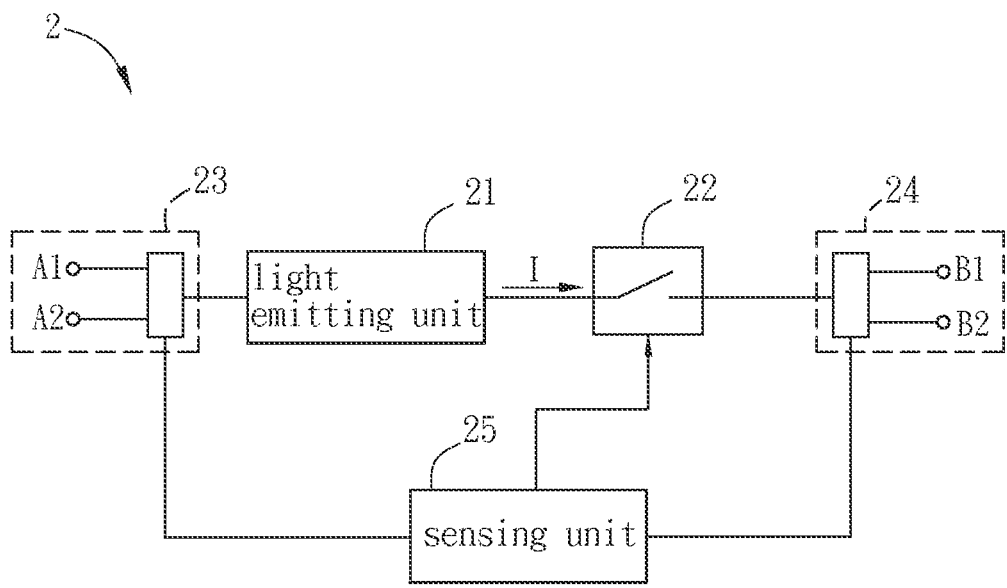
FIGS. 2A and 2B are schematic illustrations showing a light emitting apparatus according to a preferred embodiment of the invention.

FIG. 2A is a schematic illustration showing a light emitting apparatus 2 according to a preferred embodiment of the invention.

It is to be specified that a light emitting apparatus 2 of the invention is not restricted to be compatible with the conventional longitudinal daylight lamp (also referred to as a fluorescent lamp) to replace only the conventional daylight lamp.

In other embodiments, the light emitting apparatus 2 may have another aspect to replace the other daylight lamps with another shape, such as the lamp with the circular shape, the mosquito coil shape, the rectangular shape or any other shape. Herein, the invention is not particularly restricted thereto. Nevertheless, in order to replace the conventional daylight lamp, the light emitting apparatus 2 may be made to have the external shape the same as that of the conventional daylight lamp, and may be installed and engaged with the lamp holder of the conventional lamp base. In addition, the light emitting apparatus 2 may receive an external power (not shown), and the source of the external power may be a mains power with the voltage equal to AC 110 volts or 220 volts, for example, and the frequency equal to 50 Hertz (Hz), 60 Hertz or a multiple thereof, for example. In addition, the source of the external power may also be an electronic ballast for driving a fluorescent lamp, a combination of a coil ballast and a starter, or a DC power. Herein, the invention is not particularly restricted thereto.

The light emitting apparatus 2 includes a light emitting unit 21, at least one switching unit 22, a first electrical connection element 23, a second electrical connection element 24 and a sensing unit 25.

The light emitting unit 21 may have a plurality of LEDs connected in series or in parallel, the LEDs may have the same or different light emitting properties or sizes. The light emitting property may include the light emitting color, color temperature, power, brightness or the like. In addition, the light emitting unit 21 may also include at least one alternating current light emitting diode (AC LED) module. The AC LED module may have a plurality of LEDs, which may be, for example, connected in series or in parallel to form a bridge, or any two of the LEDs may be oppositely connected. Herein, the invention is not particularly restricted thereto.

The switching unit 22 may be electrically connected with the light emitting unit 21. Herein, the light emitting unit 21 and the switching unit 22 may be connected in series. The default state of the switching unit 22 is OFF. That is, the switching unit 22 has the cut-off state when it is not controlled. The switching unit 22 may include, for example, a relay, a semiconductor switch element (e.g., transistor) or a silicon-controlled rectifier (SCR). The switching unit 22 is preferably a high-voltage withstanding switch to satisfy the insulating requirement.

The first electrical connection element 23 may be electrically connected with the external power and the light emitting unit 21. Herein, the first electrical connection element 23 has two electrical input terminals (i.e., a first electrode A1 and a second electrode A2), and after the first electrical connection element 23 of the light emitting apparatus 2 is installed on the lamp holder, the external power may supply the electric power to the first electrode A1 and the second electrode A2 of the first electrical connection element 23. In this case, the current flowing between the first electrode A1 and the second electrode A2 is named as a filament current.

The second electrical connection element 24 may be electrically connected with the external power and the switching unit 22. Herein, the second electrical connection element 24 has two electrical input terminals (i.e., a first electrode B1 and a second electrode B2), and after the second electrical connection element 24 is installed on the lamp holder, the external power may supply the electric power to the first electrode B1 and the second electrode B2 of the second electrical connection element 24. In this case, the current flowing between the first electrode B1 and the second electrode B2 is also named as a filament current. The electrical input terminals (i.e., the first electrode A1 and the second electrode A2, the first electrode B1 and the second electrode B2) of the first electrical connection element 23 and the second electrical connection element 24 may match with the lamp holder of a fluorescent lamp (e.g., daylight lamp). It is to be specified that if the light emitting apparatus 2 and the conventional daylight lamp have the same external shape, then the first electrical connection element 23 and the second electrical connection element 24 may be located on two opposite ends of the light emitting unit 21. In addition, if the light emitting apparatus 2 is an annular, U-shaped or W-shaped lamp, then the first electrodes A1 and B1 and the second electrodes A2 and B2 of the first electrical connection element 23 and the second electrical connection element 24 may be located on the same side of the light emitting unit 21. Herein, the invention is not particularly restricted thereto.

It is to be specified that when the light emitting apparatus 2 of the invention has not been connected with the external power yet in the initial condition, the light emitting unit 21 is not electrically connected with at least one of the first electrical connection element 23 and the second electrical connection element 24 because the default state (the factory's default state) of the switching unit 22 is OFF.

The sensing unit 25 is electrically connected with the first electrical connection element 23, the second electrical connection element 24 and the switching unit 22. The sensing unit 25 may have a sensing element, which preferably has an input terminal and an output terminal electrically insulated from the input terminal. The sensing element may include, for example, a photo coupler or a coil (e.g., a coil of a relay).

When the sensing unit 25 senses that filament currents flow between the two electrical input terminals (i.e., the first electrode A1 and the second electrode A2) of the first electrical connection element 23 and between the two electrical input terminals (i.e., the first electrode B1 and the second electrode B2) of the second electrical connection element 24, the sensing unit 25 controls the switching unit 22 to turn on to enable the current I, generated by the external power, to flow through the lamp current path formed by the first electrical connection element 23, the light emitting unit 21, the switching unit 22 and the second electrical connection element 24 and to enable the light emitting unit 21 to emit light. However, if the sensing unit 25 only senses that the filament current flows between two electrical input terminals of a certain electrical connection element (e.g., only senses that the filament current flows between the first electrode A1 and the second electrode A2 of the first electrical connection element 23), then the switching unit 22 does not turn on. Thus, the current I generated by the external power cannot flow through the lamp current path formed by the first electrical connection element 23, the light emitting unit 21 and the second electrical connection element 24. Thus the user, if inadvertently touching the second electrical connection element 24 during installation, is free from the risk of the electric shock.

Figure 2B:
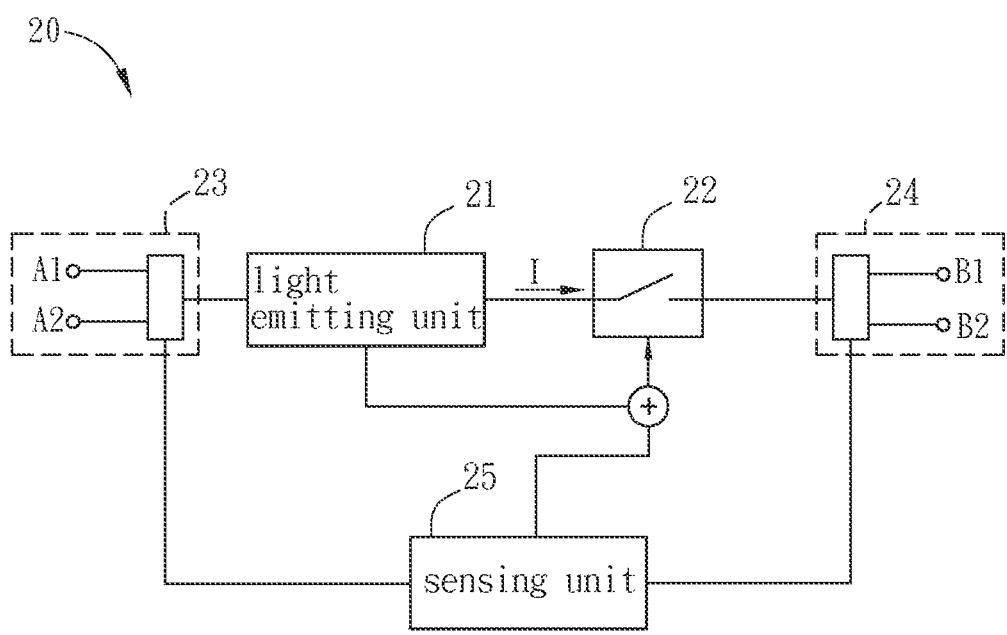

FIG. 2B is a schematic illustration showing another light emitting apparatus 20 according to a preferred embodiment of the invention. Different form FIG. 2A, the switching unit 22 of FIG. 2B is controlled by not only the sensing unit 25 but also the light emitting state of the light emitting unit 21, so that the switching unit 22 can keep the turning-on state after the light emitting unit 21 starts to emit light without the control of the sensing unit 25, and that the light emitting unit 21 continuously emits light to form a conducting state similar to a self-latched turning-on state until the external power is cut off.

How to implement the circuit of the light emitting apparatus of the invention will be described with reference to the following associated drawings. FIGS. 3A to 3K are schematic circuit diagrams showing light emitting apparatuses 2a-2k according to different aspects of the invention, respectively.

Figure 3A:
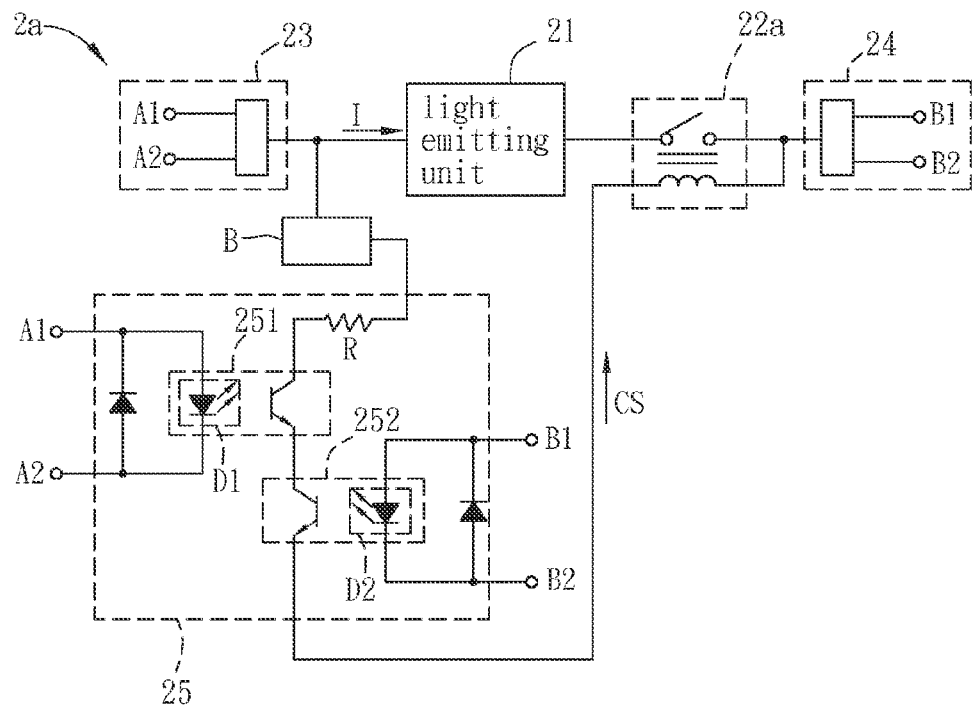
FIGS. 3A to 3K are schematic circuit diagrams showing light emitting apparatuses according to different aspects of the invention, respectively.

Referring to FIG. 3A, the sensing unit 25 of the light emitting apparatus 2a has two sensing elements 251 and 252. The first electrode A1 and the second electrode A2 of the first electrical connection element 23 are electrically connected with the sensing element 251, and the first electrode B1 and the second electrode B2 of the second electrical connection element 24 are electrically connected with the sensing element 252. Herein, the first electrode A1 and the second electrode A2 are electrically connected with two terminals of a LED D1 of the sensing element 251, and the second electrode B2 of the first electrode B1 is electrically connected with two terminals of a LED D2 of the sensing element 252.

The sensing element 251 may sense whether there is a filament current flowing between the first electrode A1 and the second electrode A2 of the first electrical connection element 23 (e.g., whether there is a current flowing from the first electrode A1 to the second electrode A2), while the sensing element 252 may sense whether there is a filament current flowing between the first electrode B1 and the second electrode B2 of the second electrical connection element 24 (e.g., whether there is a filament current flowing from the first electrode B1 to the second electrode B2). In this aspect and example, each of the sensing elements 251 and 252 is a photo coupler. The photo coupler has the advantage that the input terminal is electrically insulated from the output terminal. Therefore, when the sensing elements 251 and 252 are sensing the filament currents, no leakage current is generated between the first electrical connection element 23 and the second electrical connection element 24 to cause the risk of electric shock.

In addition, in order to enable the sensing unit 25 to provide a sensing signal CS to control the switching unit 22a, a power has to be additionally provided to the sensing unit 25. The source of the power may be a DC power or an AC power. In FIG. 3A, the source of the power provided to the sensing unit 25 is the external power (e.g., an AC power) provided to the light emitting apparatus 2a, wherein the external power is rectified by a rectifying element B (e.g., a bridge rectifier), and then a DC power is provided to the photo coupler of the sensing unit 25 through a resistor R, so that the sensing unit 25 can output the sensing signal CS.

When the first electrical connection element 23 of the light emitting apparatus 2a is installed in a lamp holder and electrically connected with the external power and when the external power is provided between the first electrode A1 and the second electrode A2 of the first electrical connection element 23 and a filament current flows therebetween, the LED D1 of the sensing element 251 can emit light to turn on the sensing element 251. At this time, the sensing element 252 does not turn on, so the sensing unit 25 does not output the sensing signal CS, and the switching unit 22a still turns off. So, there is no risk of electric shock when the user only firstly inserts the first electrical connection element 23 into the lamp holder and inadvertently touches the second electrical connection element 24 during installation.

When the second electrical connection element 24 of the light emitting apparatus 2a is also installed into another lamp holder and electrically connected with the external power, the external power is also provided between the first electrode B1 and the second electrode B2 of the second electrical connection element 24 and a filament current flows therebetween, the LED D2 of the sensing element 252 can emit light to turn on the sensing element 252. At this time, the voltage provided by the rectifying element B enables the sensing unit 25 to output the sensing signal CS to the coil of the switching unit 22a. Herein, the switching unit 22a is a relay. The switching unit 22a conducts its connection terminals because the sensing signal CS flows through its coil. So, the current I generated by the external power can flow through the lamp current path formed by the first electrical connection element 23, the light emitting unit 21, the switching unit 22a and the second electrical connection element 24 to enable the light emitting unit 21 to emit light.

Figure 3B:
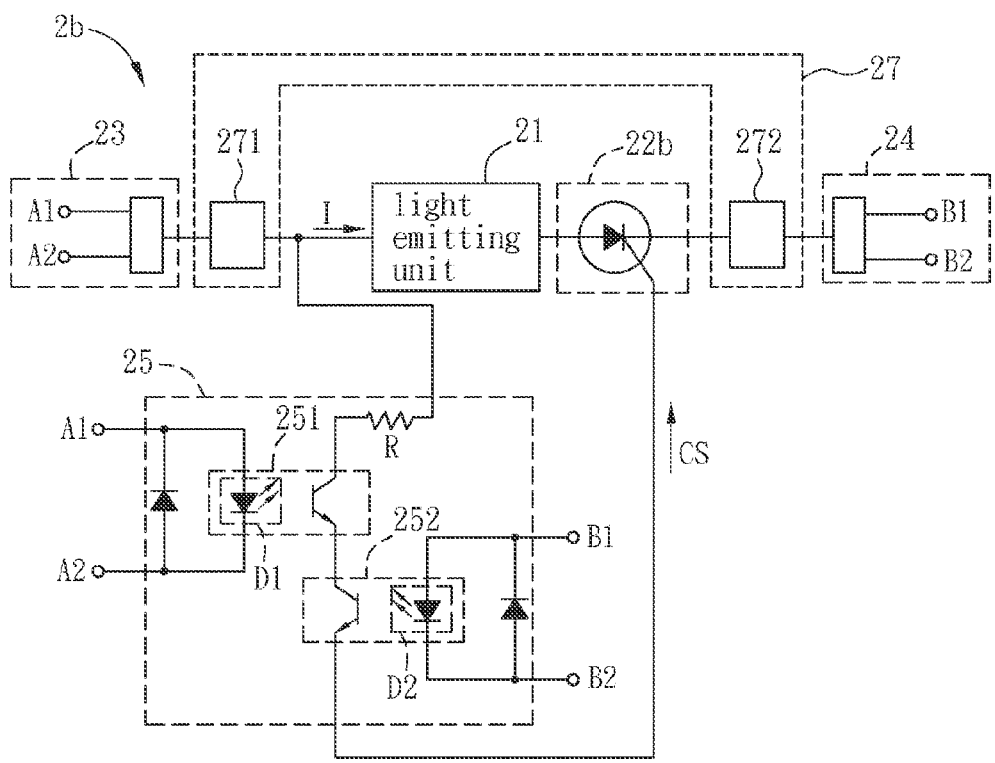

Referring to FIG. 3B, the circuit architecture of the light emitting apparatus 2b of FIG. 3B is substantially the same as the light emitting apparatus 2a except for the main difference that the switching unit 22b of the light emitting apparatus 2b is a silicon-controlled rectifier having a gate, which is electrically connected with the sensing unit 25 and can receive the sensing signal CS to control the switching unit 22b to turn on. In addition, the light emitting apparatus 2b may further include a rectifying unit 27 including a rectifying element 271 and a rectifying element 272. The rectifying element 271 is electrically connected with the first electrical connection element 23, the light emitting unit 21 and the sensing unit 25, while the rectifying element 272 is electrically connected with the switching unit 22b and the second electrical connection element 24. The rectifying element 271 and the rectifying element 272 may be merged into a bridge rectifier, for example. In addition to the provision of the operation voltage to the photo coupler of the sensing unit 25, the rectifying unit 27 can further provide the power to the light emitting unit 21 and the switching unit 22b (silicon-controlled rectifier). Herein, the current outputted from the rectifying unit 27 is controlled by the switching unit 22a.

When the first electrical connection element 23 and the second electrical connection element 24 of the light emitting apparatus 2b are electrically connected with the external power, a filament current flows between the first electrode A1 and the second electrode A2 of the first electrical connection element 23, and a filament current also flows between the first electrode B1 and the second electrode B2 of the second electrical connection element 24. So, the sensing element 251 and the sensing element 252 can turn on to enable the sensing unit 25 to output the sensing signal CS to the gate of the silicon-controlled rectifier (switching unit 22b) so that the silicon-controlled rectifier can turn on. Thus, the light emitting unit 21 can light up to emit light.

After the light emitting unit 21 starts to emit light, the switching unit 22b can continuously keep turning on according to the lamp current, crossover voltage or emitted light generated by the light emitting unit 21 that is emitting light, or according to the property of the lamp current flowing through the switching unit 22b itself. In this embodiment, even if the sensing unit 25 stops outputting the sensing signal CS (e.g., no more filament current flows between the first electrode A1 and the second electrode A2 of the first electrical connection element 23) due to some reasons, the switching unit 22b can stay turning on by forming a self-latched loop with the lamp current flowing through the silicon-controlled rectifier itself. For example, when the external power contains a coil type ballast and a starter used in conjunction with a fluorescent lamp, the starter only provides filament currents between the first electrode A1 and the second electrode A2 and between the first electrode B1 and the second electrode B2 when the AC power is just started or initially applied. The filament current enables the sensing unit 25 to output the sensing signal CS to the gate of the silicon-controlled rectifier (switching unit 22b), and enables the silicon-controlled rectifier (switching unit 22b) to turn on and let the lamp current flow through the light emitting unit 21. After the light emitting unit 21 (i.e., the lamp) starts to emit light, the starter stops providing the filament current. At this time, the sensing unit 25 no longer outputs the sensing signal CS, but the light emitting unit 21 still continues to emit light due to the self-latched loop of the silicon-controlled rectifier.

Figure 3C:
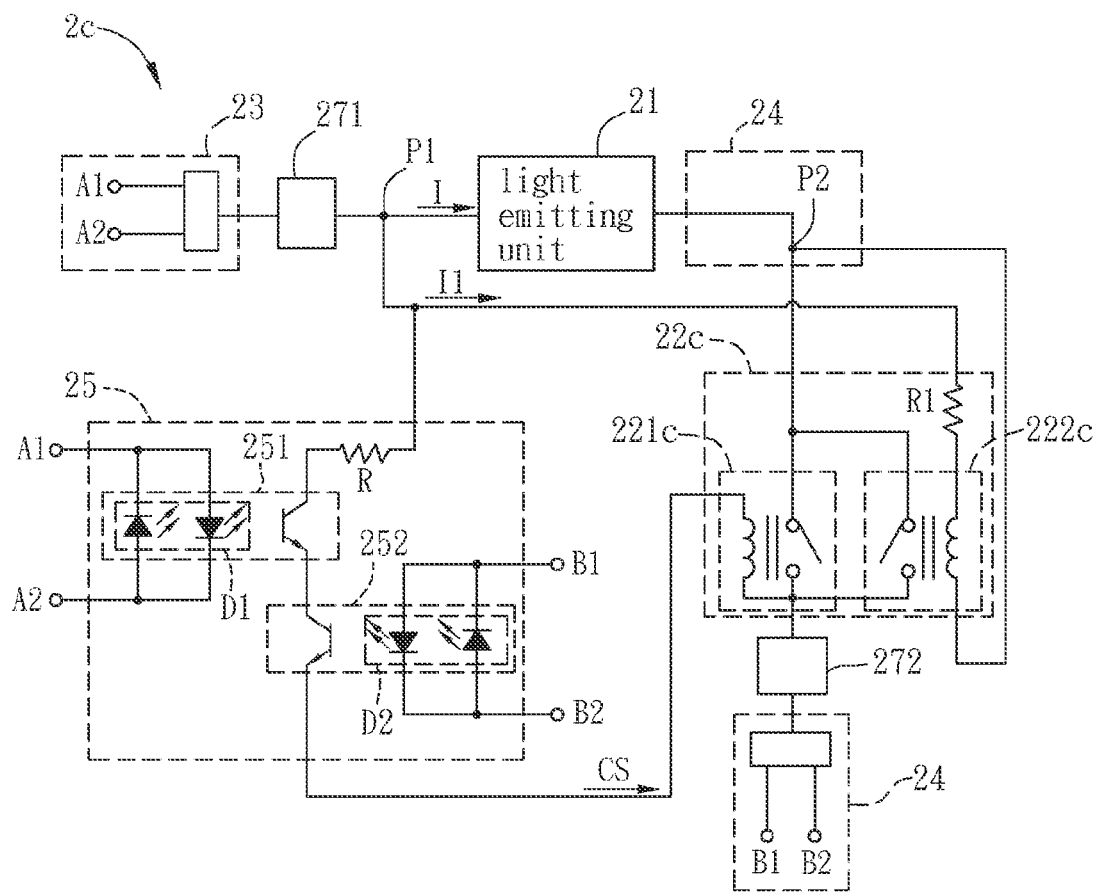

Referring to FIG. 3C, the circuit architecture of the light emitting apparatus 2c of FIG. 3C is substantially the same as the light emitting apparatus 2b except for the main difference that the switching unit 22c of the light emitting apparatus 2c has two switch elements 221c and 222c and a resistor R1, and the switch elements 221c and 222c are relays electrically connected with the light emitting unit 21.

When the first electrical connection element 23 and the second electrical connection element 24 of the light emitting apparatus 2c are electrically connected with the external power, a filament current flows between the first electrode A1 and the second electrode A2 of the first electrical connection element 23, and a filament current also flows between the first electrode B1 and the second electrode B2 of the second electrical connection element 24. So, the sensing element 251 and the sensing element 252 can turn on to enable the sensing unit 25 to output the sensing signal CS to the coil of the switch element 221c of the switching unit 22c, and to enable the switch element 221c to conduct the connection terminals thereof and thus to enable the light emitting unit 21 to emit light. At this time, a crossover voltage is generated between the terminals P1 and P2 on two sides of the light emitting unit 21 (i.e., the voltage difference is generated between the terminals P1 and P2 because the light emitting unit 21 lights up), and this crossover voltage induces a current I1 flowing through the coil of the switch element 222c via the resistor R1, so that the switch element 222c turns on to generate the self-latched loop. Even if the sensing unit 25 does not again output the sensing signal CS, which is inputted to the coil of the switching unit 221c to make the switch element 221c cut off, due to some reasons, the switch element 222c still continuously turns on due to the voltage difference between the terminals P1 and P2 of the light emitting unit 21 so that the self-latched loop can also be formed.

Figure 3D:
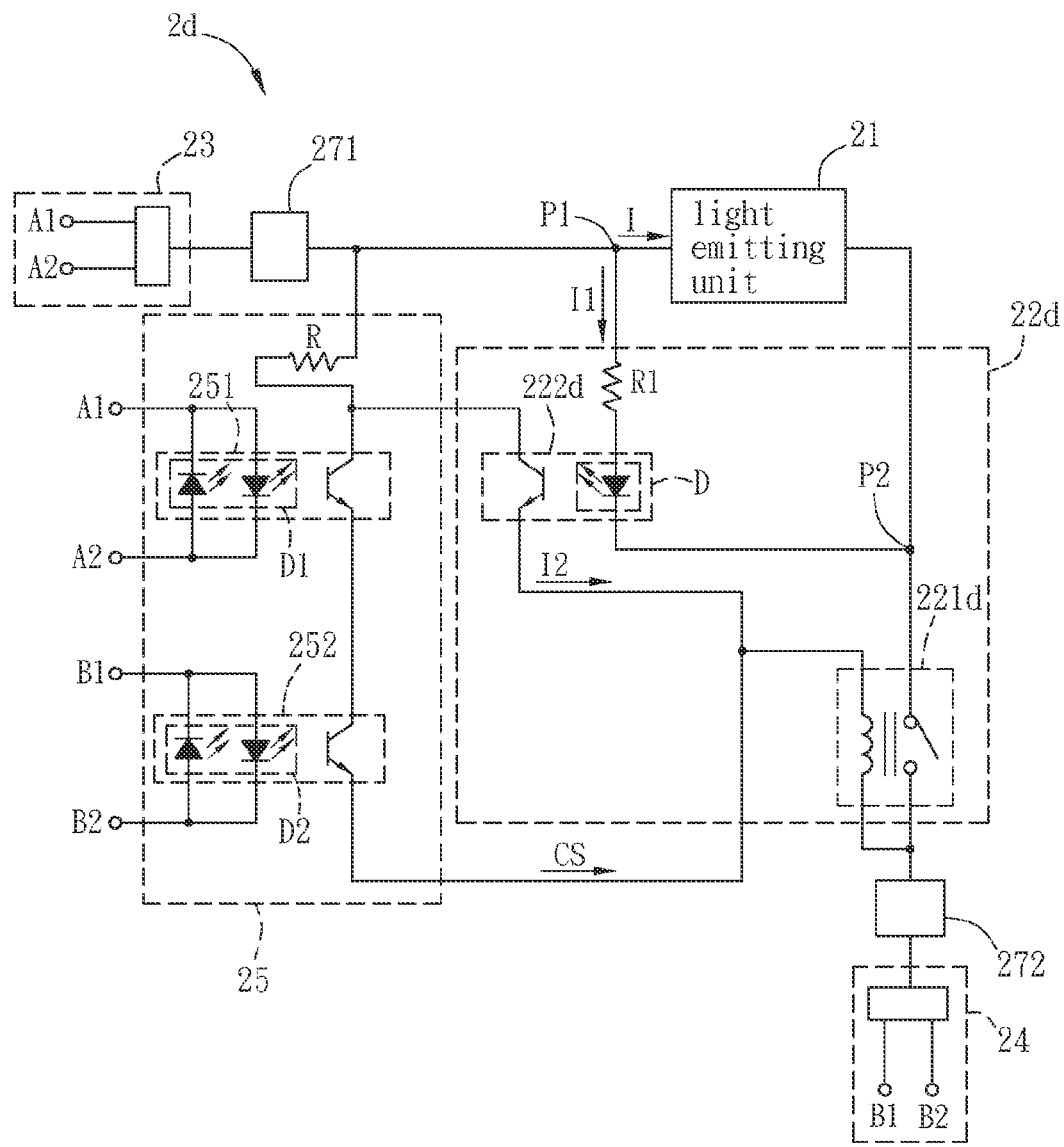

Referring to FIG. 3D, the circuit architecture of the light emitting apparatus 2d of FIG. 3D is substantially the same as the light emitting apparatus 2c except for the main difference that the switch element 222d of the switching unit 22d of the light emitting apparatus 2d is a photo coupler, and the switch elements 221d and 222d are electrically connected with the light emitting unit 21.

When the first electrical connection element 23 and the second electrical connection element 24 of the light emitting apparatus 2d are electrically connected with the external power, a filament current flows between the first electrode A1 and the second electrode A2 of the first electrical connection element 23, and a filament current also flows between the first electrode B1 and the second electrode B2 of the second electrical connection element 24. So, the sensing element 251 and the sensing element 252 can turn on to enable the sensing unit 25 to output the sensing signal CS to the switch element 221d of the switching unit 22d to enable the switch element 221d to conduct the connection terminals thereof and thus to enable the light emitting unit 21 to emit light. At this time, a crossover voltage is generated between the terminals P1 and P2 on two sides of the light emitting unit 21, and this crossover voltage will induce a current I1 flowing through the switch element 222d (the LED D of the photo coupler) via the resistor R1, so that a current I2 flowing through the resistor R of the sensing unit 25 and the switch element 222d can be generated and flows through the coil of the switch element 221d to generate a self-latched loop. Even if the sensing unit 25 does not again output the sensing signal CS due to some reasons, the switch element 221d still can continuously turn on due to the conducting state of the switch element 222d (because the voltage difference is still generated between the terminals P1 and P2 of the light emitting unit 21), so that the self-latched loop may also be formed.

Figure 3E:
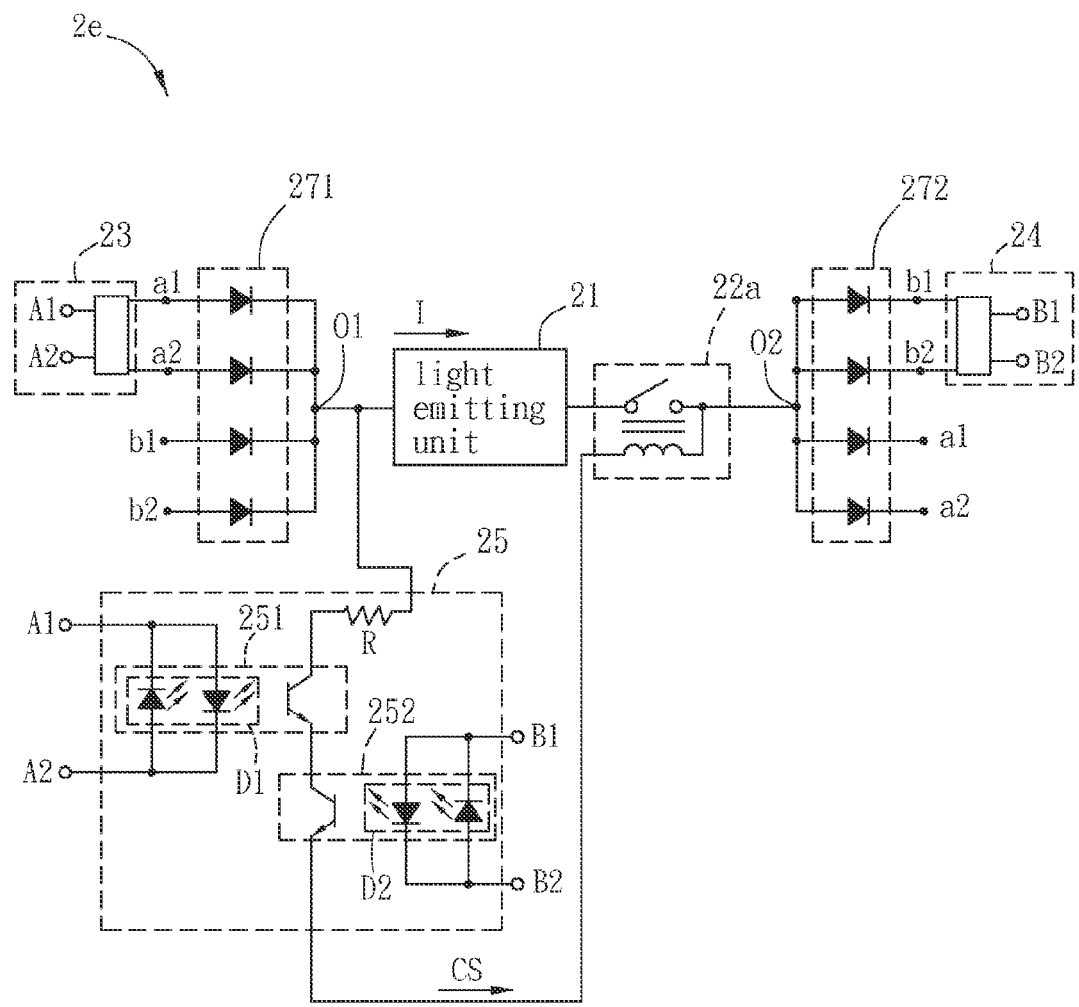

Referring to FIG. 3E, the circuit architecture of the light emitting apparatus 2e of FIG. 3E is substantially the same as the light emitting apparatus 2a except for the main difference that the light emitting apparatus 2e has two rectifying elements 271 and 272 respectively having output terminals O1 and O2 electrically connected with the light emitting unit 21. The rectifying elements 271 and 272 are electrically connected with the first electrical connection element 23 and the second electrical connection element 24. The rectifying elements 271 and 272 form the architecture of a full-wave rectifier.

Figure 3F:
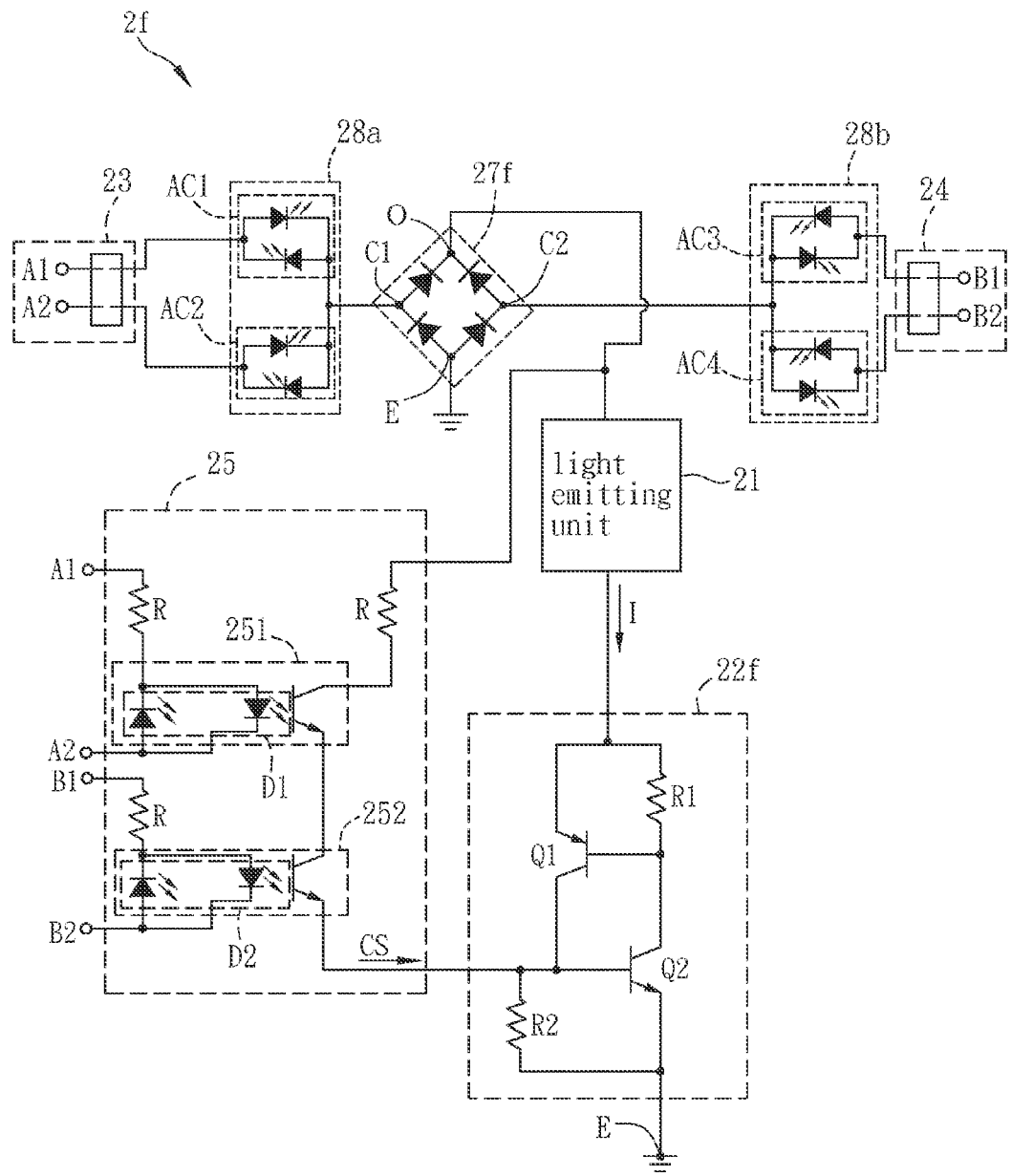

Referring to FIG. 3F, the circuit architecture of the light emitting apparatus 2f of FIG. 3F is substantially the same as the light emitting apparatus 2b except for the main difference that the rectifying unit 27f of the light emitting apparatus 2f is composed of a bridge rectifier, and the rectifying unit 27f (bridge rectifier) has a first input terminal C1 electrically connected with an AC LED module 28a, and a second input terminal C2 electrically connected with an AC LED module 28b. The first electrical connection element 23 is electrically connected with the external power and the AC LED module 28a, while the second electrical connection element 24 is electrically connected with the external power and the AC LED module 28b. The AC LED modules 28a and 28b are configured such that the bridge rectifier can receive the AC powers from the first electrode A1 and the second electrode A2 of the first electrical connection element 23, and from the first electrode B1 and the second electrode B2 of the second electrical connection element 24, and cannot fail to receive the external power due to different installing directions of the light emitting apparatus 2f.

In addition, the light emitting apparatus 2f may further include at least one impedance element, which may be electrically connected between the electrical input terminals of the first electrical connection element 23 or the electrical input terminals of the second electrical connection element 24. In this embodiment, two AC LED modules 28a and 28b serve as an example of the impedance element, while the AC LED module 28a is electrically connected between the first electrode A1 and the second electrode A2 of the first electrical connection element 23. The first electrode A1 and the second electrode A2 are electrically connected with the first input terminal C1 through the AC LED module 28a. The AC LED module 28b is electrically connected between the first electrode B1 and the second electrode B2 of the second electrical connection element 24. The first electrode B1 and the second electrode B2 are electrically connected with the second input terminal C2 through the AC LED module 28b. The impedance element may be a resistor, an inductor, a capacitor, a diode, at least one AC LED module, or a combination thereof. In this embodiment, for example, the AC LED module 28a includes two AC LED groups AC1 and AC2, and the AC LED module 28b includes two AC LED groups AC3 and AC4. Each of the AC LED groups AC1 to AC4 has two LEDs, and any two of the LEDs are oppositely connected together, and all the sets of the two oppositely connected AC LEDs are then cascaded. However, the number of the oppositely connected LEDs and the number of the serially connected AC LEDs are not particularly restricted. In other aspects, the numbers thereof may be different from one another.

The provision of the impedance element enables the light emitting apparatus 2f to directly replace the conventional daylight lamp (or fluorescent lamp) having the ballast, so that the starter and ballast of the lamp base need not to be removed, or the lines of the lamp base need not to be modified. When the light emitting apparatus 2f is used to replace the conventional daylight lamp connected with the coil ballast and the starter and if the first electrode A1 is connected with one terminal of the mains, the coil ballast is connected with the other terminal of the mains and the first electrode B1, and the starter is connected between the second electrodes A2 and B2, then the switching unit 22f does not turn on upon the initial powering. At this time, the mains voltage reaches one terminal of the starter through the first electrode B1, the impedance element 28b and the second electrode B2 via the coil ballast, and reaches the other terminal of the starter through the first electrode A1, the AC LED module 28a and the second electrode A2. The high voltage upon the initial powering enables the starter to turn on and induce a filament current. The filament current causes a voltage drop on each of the AC LED modules 28a and 28b, so that voltage differences are generated between the first electrode A1 and the second electrode A2 and between the first electrode B1 and the second electrode B2. The voltage differences cause the input terminals of the sensing elements 251 and 252 to generate currents, respectively, and the sensing unit 25 outputs the sensing signal CS to turn on the switching unit 22f. Thus, the lamp current can flow through the light emitting unit 21, which emits light. After the switching unit 22f turns on, the lamp current flows between the first input terminal C1 and the second input terminal C2. That is, the lamp current can flow from the mains through the first electrode A1 of the first electrical connection element 23, the diode (forward biased) of the AC LED module 28a, the first input terminal C1 and the output terminal O of the rectifying unit 27f (bridge rectifier), the light emitting unit 21, the switching unit 22f, which has turned on at this time, the ground E of the switching unit 22f, the ground E and the second input terminal C2 of the rectifying unit 27f (bridge rectifier) and the diode (forward biased) of the AC LED module 28b, then flow to the coil ballast through the first electrode B1, and then flow back to the mains. At this time, the two terminals of the starter connected with the second electrodes A2 and B2 no longer sense the high voltage because the switching unit 22f has turned on. Thus, the starter no longer turns on, and does not operate during the period when the light emitting unit 21 continuously emits light. Thus, when the conventional daylight lamp, connected with the coil ballast and the starter, is replaced with the light emitting apparatus 2f, the starter and the ballast need not to be removed, or the lines of the lamp base need not to be modified.

In addition, when the light emitting apparatus 2f is used to replace the conventional fluorescent lamp connected with the electronic ballast, the electronic ballast usually detects whether the filament current is present. At this time, there are two current paths, which can provide the simulated filament current loop for the detection of the electronic ballast. The current flows between the first electrode A1 and the second electrode A2 of the first electrical connection element 23 (through the AC LED module 28a), or between the first electrode B1 and the second electrode B2 of the second electrical connection element 24 (through the AC LED module 28b). Herein, the functions of the impedance elements 28a and 28b are similar to those of the filament of the conventional fluorescent lamp having the ballast. Thus, the provision of the impedance elements (AC LED modules 28a and 28b) enables the light emitting apparatus 2f to directly replace the conventional fluorescent lamp having the ballast without removing the starter and the ballast of the lamp base or modifying the connections of the lamp base.

In addition, the additional main differences between the light emitting apparatus 2f and the light emitting apparatus 2b will be described in the following. The switching unit 22f of the light emitting apparatus 2f does not use a single silicon-controlled rectifier, but includes electronic circuits including transistors Q1 and Q2, the circuit operates the same as that of the silicon-controlled rectifier. In detail, the switching unit 22f of the light emitting apparatus 2f is an electronic circuit composed of two transistors Q1 and Q2 and two resistors R1 and R2. When filament currents flow between the first electrode A1 and the second electrode A2 of the first electrical connection element 23 and between the first electrode B1 and the second electrode B2 of the second electrical connection element 24, the sensing unit 25 can output the sensing signal CS, which is inputted to the base of the transistor Q2 of the switching unit 22f, so that the switching unit 22f can turn on to light up the light emitting unit 21 to emit light. After the switching unit 22f turns on, the transistor Q2 can provide the base current required by the transistor Q1, and the transistor Q1 can provide the base current required by the transistor Q2. That is, the switching unit 22f is in a self-latched turn-on state.

After the light emitting unit 21 starts to emit light, the switching unit 22f can continuously keep turning on according to its own circuit property. Even if the sensing unit 25 does not output the sensing signal CS due to some reasons, the switching unit 22f still continuously turns on to form a self-latched loop due to the properties of the electronic circuits of the transistors Q1 and Q2.

Figure 3G:
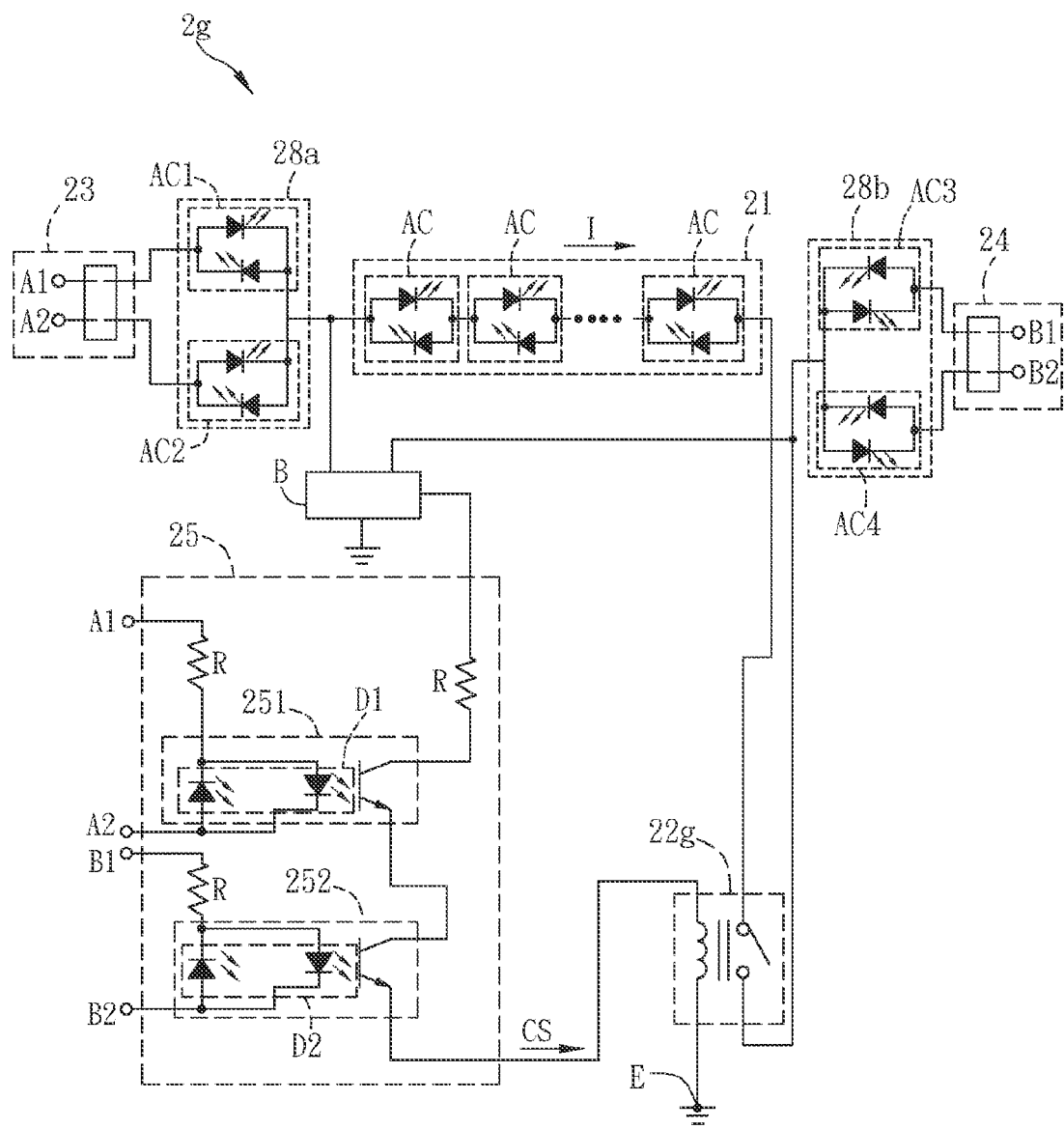

Referring to FIG. 3G, the circuit architecture of the light emitting apparatus 2g of FIG. 3G is substantially the same as the light emitting apparatus 2f except for the main difference that the switching unit 22g is a relay. In addition, the light emitting apparatus 2g has no rectifying unit, and the light emitting unit 21 of the light emitting apparatus 2g may have a plurality of AC LED groups AC connected in serial, and each AC LED group AC may have two LEDs, and two of the LEDs are connected in parallel in opposite directions. In other words, the external power is directly inputted to the light emitting unit 21 having a plurality of serially connected AC LED groups AC without going through the rectifying unit. Thus, the light emitting apparatus 2g is an AC LED light emitting apparatus.

Figure 3H:
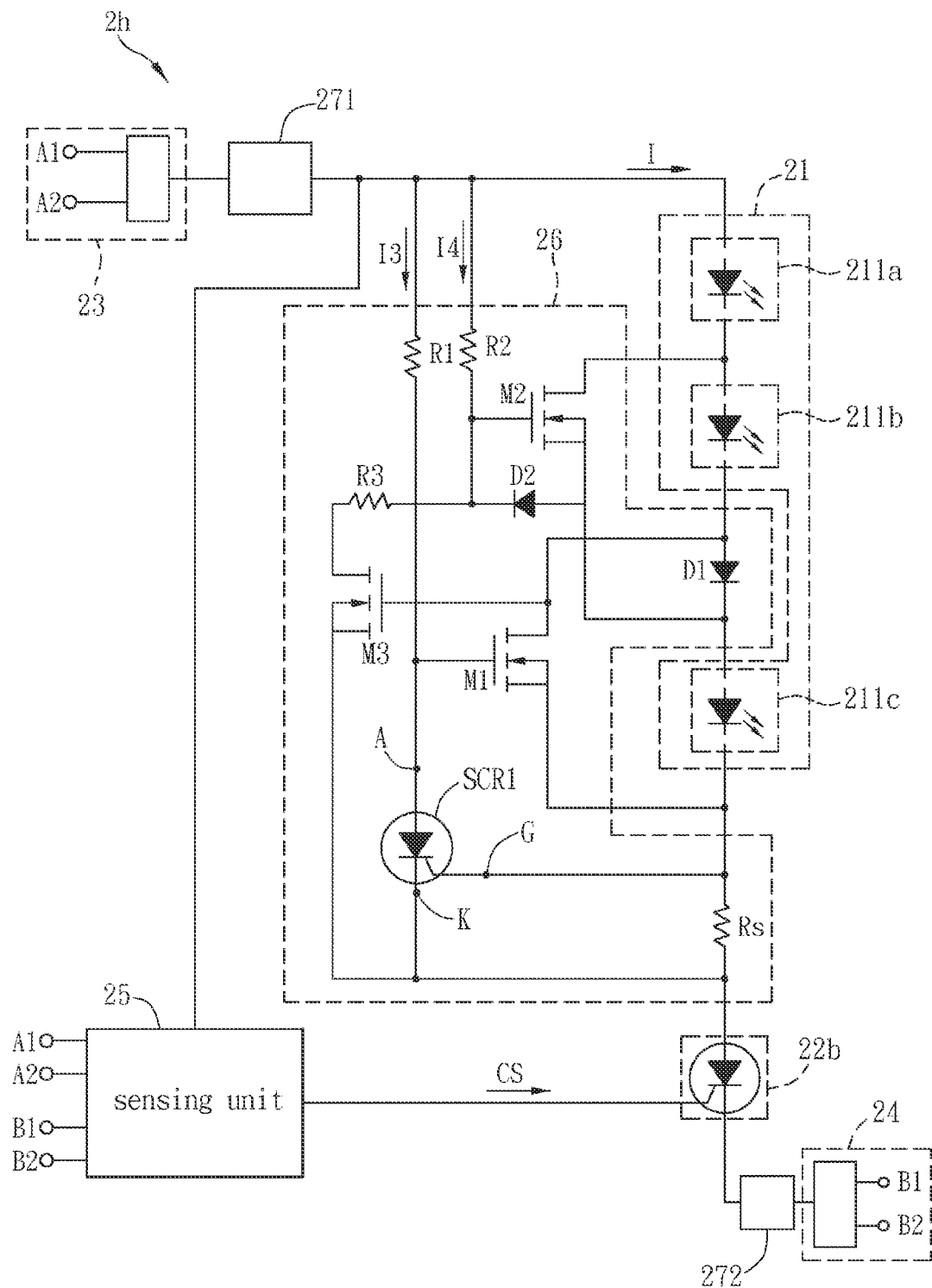

Referring to FIG. 3H, the circuit architecture of the light emitting apparatus 2h of FIG. 3H is substantially the same as the light emitting apparatus 2b of FIG. 3B except for the main difference that the light emitting apparatus 2h may further include a control unit 26 electrically connected with the light emitting unit 21. The control unit 26 and the light emitting unit 21 may be connected in series or in parallel. Alternatively, the control unit 26 may be serially connected with a portion of the light emitting unit 21 and connected with the other portion of the light emitting unit 21 in parallel. The control unit 26 can control the lighting brightnesses, colors, number of lighting operations and/or lighting order of the LEDs of the light emitting unit 21, or the serial-parallel configuration of the LEDs. The control unit 26 may be a digital or analog control circuit. In this example, the control unit 26 is an analog circuit.

In addition, the light emitting unit 21 may have a plurality of LED modules 211a to 211c, wherein only one LED is depicted in each of the modules 211a to 211c. In the practical application, however, a plurality of LEDs connected in series or in parallel may be provided in each of the modules 211a to 211c. In this embodiment, for example, three LED modules 211a to 211c are provided, each of the LED modules 211a to 211c may represent a plurality of LEDs, the LED modules 211a to 211c may have different numbers of LEDs, and the LEDs may be connected in series, in parallel or in the serial and parallel combinations.

In this embodiment, the control unit 26 is electrically connected with the light emitting unit 21, and can control the serial-parallel configuration of the LED module 211b and the LED module 211c according to the current flowing through the light emitting unit 21. The control unit 26 has three transistors M1, M2 and M3 and a silicon-controlled rectifier SCR1, which has a gate G connected with a cathode K and a resistor Rs. The gate of the transistor M1 is connected with an anode A of the silicon-controlled rectifier SCR1. The gate of the transistor M3 is connected with the drain of the transistor M1, and the gate of the transistor M2 is connected with the drain of the transistor M3 through the resistor R3. Thus, the control unit 26 can control the serial-parallel configuration of the light emitting unit 21. In other words, when the first electrical connection element 23 and the second electrical connection element 24 are connected with the external power, the sensing unit 25 can output the sensing signal CS to turn on the switching unit 22b. At this time, if the current flowing through the resistor Rs is smaller, then the voltage difference between two terminals thereof is smaller (the voltage difference between the gate G and the cathode K of the silicon-controlled rectifier SCR1 is also smaller), the silicon-controlled rectifier SCR1 is in the cut-off state, and the gate of the transistor M1 has the high potential to turn on the transistor M1, the gate of the transistor M3 has the low potential to cut off the transistor M3 and the gate of the transistor M2 has the high potential to turn on the transistor M2, so that the LED module 211b and the LED module 211c are connected in parallel. Thus, the serial-parallel configuration of the LED modules 211a to 211c of the light emitting unit 21 is that the LED module 211b and the LED module 211c are connected in parallel and then connected with the LED module 211a in series.

When the current flowing through the resistor Rs of the control unit 26 is larger, the voltage difference between the two terminals of the resistor Rs is also larger. When the voltage difference exceeds the starting voltage of the gate G of the silicon-controlled rectifier SCR1, the silicon-controlled rectifier SCR1 turns on and the current I3 flows through the silicon-controlled rectifier SCR1 and the resistor R1, and makes the gate of the transistor M1 have the low potential and enables the transistor M1 to enter the cut-off state. The transistor M1 cuts off to make the gate of the transistor M3 have the high potential so that the transistor M3 turns on and the current I4 flows through the transistor M3. The current I4 makes the gate of the transistor M2 have the low potential and the transistor M2 enters the cut-off state. The LED module 211b and the LED module 211c are changed from the parallel configuration to the serial configuration. When the LED modules 211a to 211c of the light emitting unit 21 are connected in series, the internal impedance of the light emitting unit 21 gets larger (because the number of the serially connected LEDs gets more and the impedance thereof gets larger) and the current flowing therethrough can be reduced, thereby preventing the too large current from flowing through and thus burning out the light emitting unit 21, or thereby decreasing the output power of the light emitting unit 21. Meanwhile, the silicon-controlled rectifier SCR1 turns on to enter the self-locked turning-on state. Even if the current is further decreased, the serial-parallel configuration of the LED modules 211a to 211c will be no longer changed until the power is cut off. Thus, the control unit 26 can control the serial-parallel configuration of the LED modules 211a to 211c according to the current flowing through the LED modules 211a to 211c.

Figure 3I:
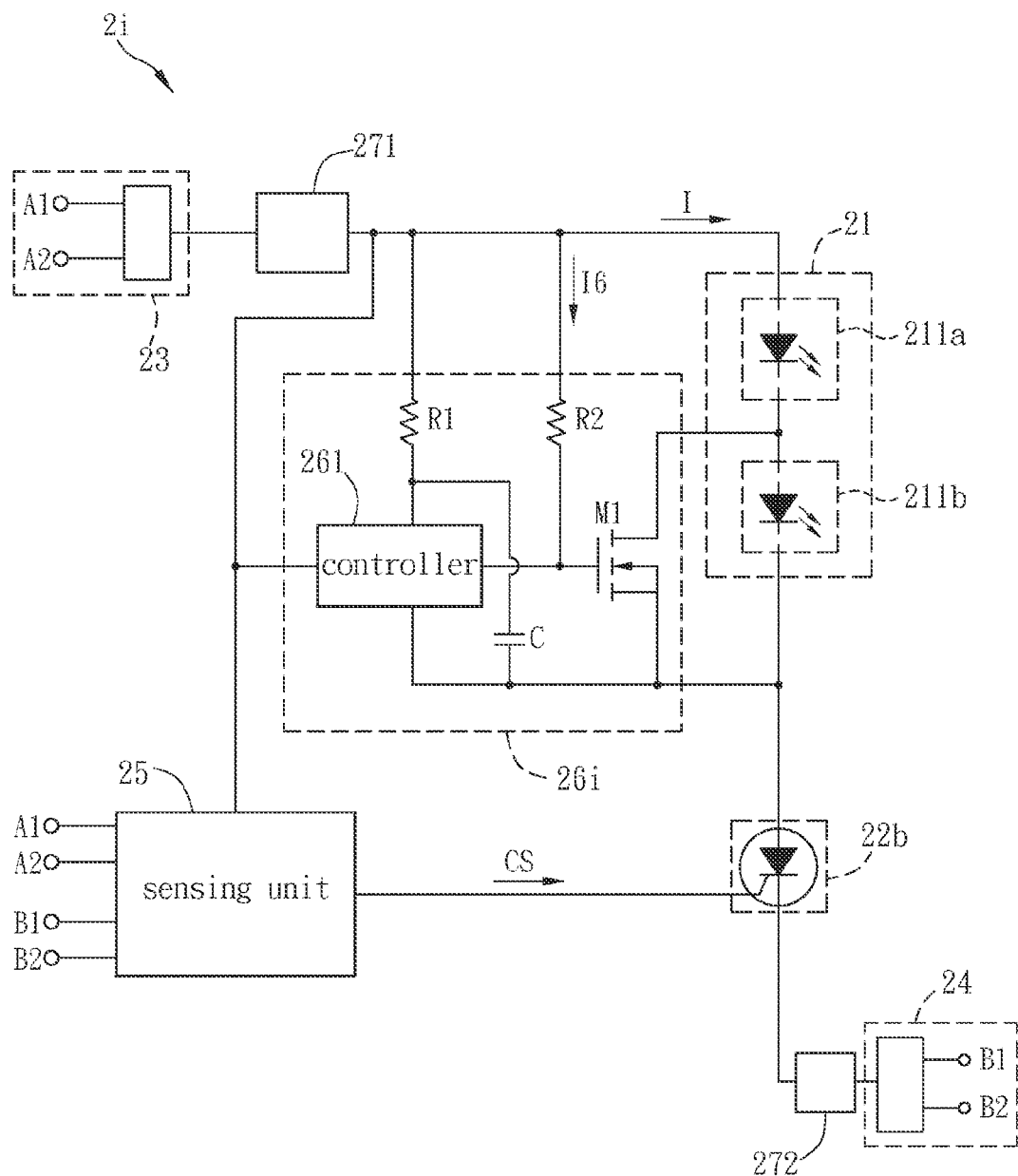

Referring to FIG. 3I, the circuit architecture of the light emitting apparatus 2i of FIG. 3I is substantially the same as the light emitting apparatus 2h of FIG. 3H except for the main difference that the control unit 26i of the light emitting apparatus 2i controls the light emitting unit 21 according to the number of interruptions of the external power within a specific time. In other words, the control unit 26i of the light emitting apparatus 2i may have a controller 261, which may include an analog or digital circuit (e.g., a microcontroller) for calculating the number of interruptions of the external power within a specific time to control the lighting brightness, color, number of lighting operations, lighting order of the light emitting apparatus 2i or the serial-parallel configuration of the LEDs. The output of the controller 261 is electrically connected with the gate of the transistor M1 to control the transistor M1 to turn on or cut off.

When the power switch (not shown) switches at the first time (i.e., the power switch is turned on at the first time to light up the light emitting apparatus 2i), the first electrical connection element 23 and the second electrical connection element 24 can be connected with the external power, and the sensing unit 25 can output the sensing signal CS to turn on the switching unit 22b. At this time, the controller 261 outputs a high potential to the gate of the transistor M1 to turn on the transistor M1, so the LED module 211b is bypassed and does not light up (only the LED module 211a lights up). When the power switch switches at the second time, the controller 261 outputs a low potential to the gate of the transistor M1, so the transistor M1 is in the cut-off state, and the current I can flow through the LED module 211b and the LED module 211a to light up the LED module 211b and the LED module 211a. Furthermore, when the power switch switches at the third time, the controller 261 again outputs a high potential to the gate of the transistor M1 to turn on the transistor M1, and the LED module 211b again extinguishes. Thus, the light emitting apparatus 2i may have the multi-stage dimming technology, and can determine the number of the lighting LEDs of the light emitting unit 21 according to the number of ON-OFF switching operations of the power switch within a fixed time, and thus adjust the lighting brightness and the number of lighting operations. This power switch may be provided on the wall or the lamp holder. Thus, the light emitting apparatus 2i can achieve the dimming and energy saving effects without the indoor wiring being modified.

Figure 3J:
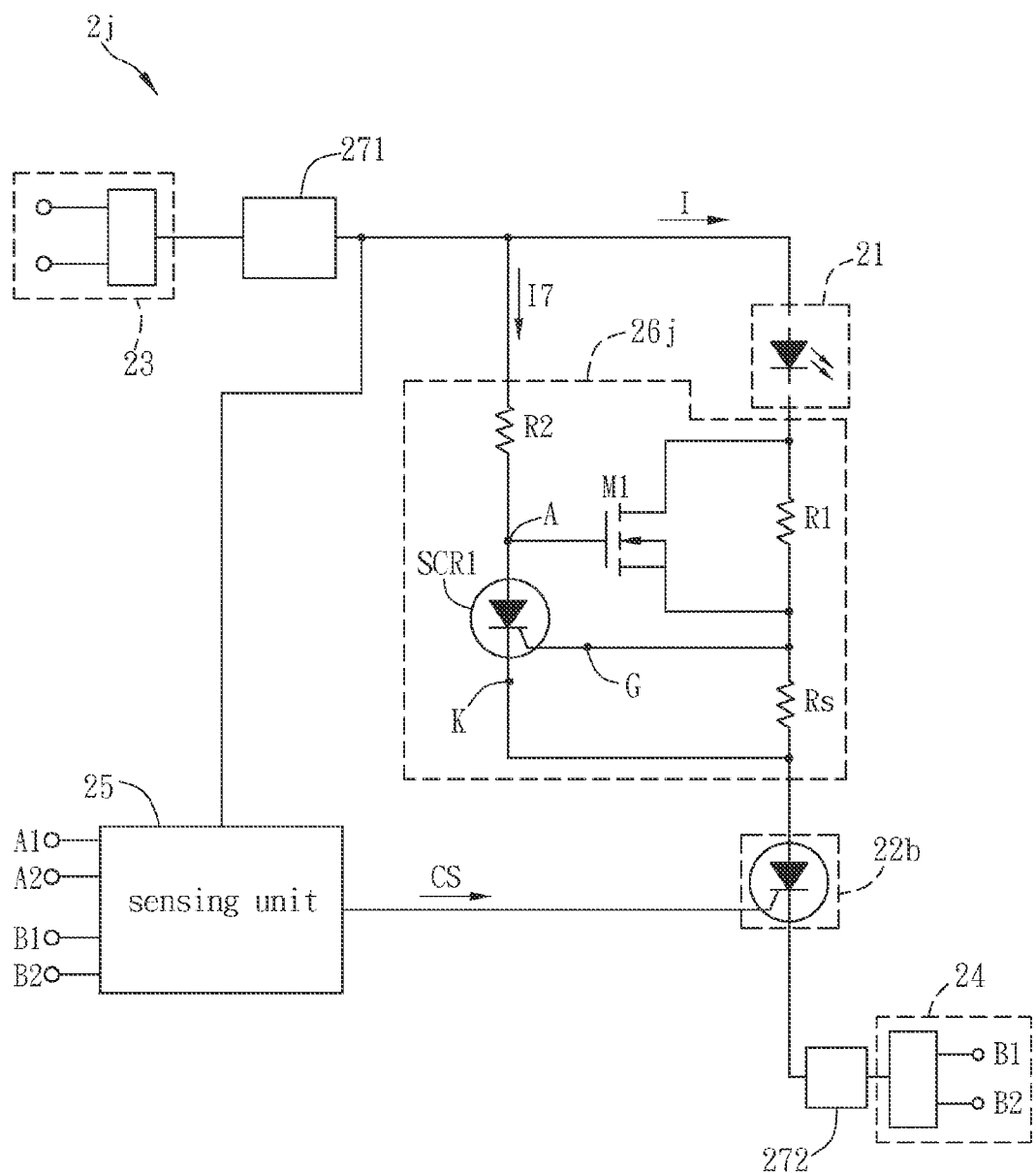

As shown in FIG. 3J, the control unit 26 is connected in parallel with the light emitting unit 21, and changes the serial connection impedance between the light emitting unit 21 and the control unit 26 according to the current of the light emitting unit 21, so as to increase the power usage efficiency inputted to the light emitting unit 21 or decrease the output power thereof in response to different conditions or input voltages.

The circuit architecture of the light emitting apparatus 2j of FIG. 3J is substantially the same as the light emitting apparatus 2h except for the main difference that the light emitting apparatus 2j only has one silicon-controlled rectifier SCR1. The anode A of the silicon-controlled rectifier SCR1 is electrically connected with the gate of the transistor M1, and the gate G and the cathode K of the silicon-controlled rectifier SCR1 are electrically connected with two terminals of the resistor Rs. When the first electrical connection element 23 and the second electrical connection element 24 are connected with the external power, the sensing unit 25 outputs the sensing signal CS to turn on the switching unit 22b. At this time, if the current flowing through the resistor Rs is smaller, then the voltage difference between the two terminals of the resistor Rs is smaller. So, the silicon-controlled rectifier SCR1 does not turn on, and the gate of the transistor M1 has the high potential to turn on the transistor M1. Thus, the two terminals of the resistor R1 are short-circuited, so that the current I flowing through the light emitting unit 21 can flow through the resistor Rs and the switching unit 22b without flowing through the resistor R1.

When the current flowing through the resistor Rs of the control unit 26j is larger, the voltage difference between the two terminals of the resistor Rs is also larger. When the voltage difference exceeds the starting voltage of the gate G of the silicon-controlled rectifier SCR1, the silicon-controlled rectifier SCR1 turns on so that the current I7 can flow through the silicon-controlled rectifier SCR1 to make the gate of the transistor M1 become the low potential. So, the transistor M1 is in the cut-off state, and the resistor R1 and the light emitting unit 21 form the serial configuration to reduce the current I flowing through the light emitting unit 21. Thus, the object of increasing the serial connection impedance to restrict the current I flowing through the light emitting unit 21 can be achieved. Meanwhile, after the silicon-controlled rectifier SCR1 turns on, it enters the self-latched turning-on state. Even if the current is again decreased, the serial configuration between the resistor R1 and the light emitting unit 21 cannot be changed until the power is cut off. Thus, the control unit 26j can change the serial connection impedance between the control unit 26j and the light emitting unit 21 according to the current I flowing through the light emitting unit 21.

Figure 3K:
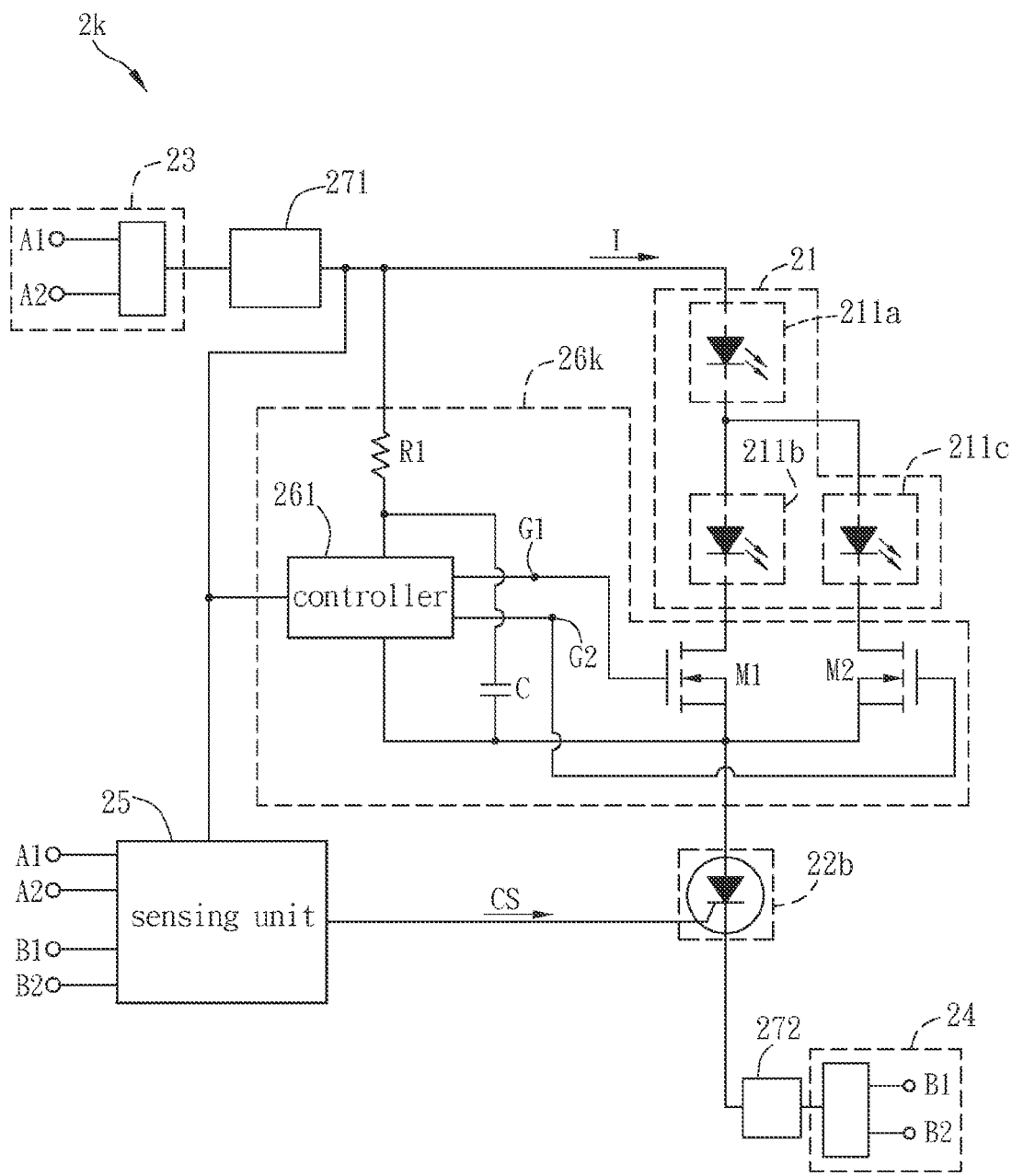

Referring to FIG. 3K, the circuit architecture of the light emitting apparatus 2k of FIG. 3K is substantially the same as the light emitting apparatus 2i of FIG. 3I except for the main difference that the control unit 26k of the light emitting apparatus 2k controls the light emitting color of the light emitting unit 21 according to the number of interruptions of the external power within a specific time. In other words, the control unit 26k of the light emitting apparatus 2k may have a controller 261, which may include an analog or digital circuit (e.g., microcontroller) for calculating the number of interruptions of the external power within a specific time to control the light emitting color of the light emitting apparatus 2k. The output terminal G1 of the controller 261 is electrically connected with the gate of the transistor M1 to control the transistor M1 to turn on or cut off. The output terminal G2 of the controller 261 is electrically connected with the gate of the transistor M2 to control the transistor M2 to turn on or cut off. The transistor M1 and the LED module 211b are connected in series, and the transistor M2 and the LED module 211c are connected in series. In addition, the LED module 211b and the LED module 211c have different light emitting colors. Herein, the LED module 211a is serially connected with the LED module 211b and the transistor M1, and the LED module 211a is serially connected with the LED module 211c and the transistor M2.

When the power switch (not shown) switches at the first time (i.e., the power switch is turned on at the first time to light up the light emitting apparatus 2k), the first electrical connection element 23 and the second electrical connection element 24 can be connected with the external power, and the sensing unit 25 can output the sensing signal CS to turn on the switching unit 22b. At this time, the output terminal G1 of the controller 261 outputs a high potential to the gate of the transistor M1 to turn on the transistor M1, so that the current I can flow through the LED module 211a and the LED module 211b, and the LED module 211a and the LED module 211b light up. Meanwhile, the output terminal G2 of the controller 261 outputs a low potential to the gate of the transistor M2 to cut off the transistor M2. So, the LED module 211c does not light up, and the light emitting color of the light emitting apparatus 2k is the mixed color of the light emitting colors of the LED module 211a and the LED module 211b. The power switch may be provided on the wall or the lamp holder.

When the power switch switches at the second time, the output terminal G1 of the controller 261 outputs a low potential to the gate of the transistor M1, so the transistor M1 is in the cut-off state. Meanwhile, the output terminal G2 outputs a high potential to the gate of the transistor M2, so the transistor M2 is in the turn-on state. At this time, the LED module 211a and the LED module 211c light up, and the LED module 211b does not light up. Thus, the light emitting color of the light emitting apparatus 2k is changed to the mixed color of the light emitting colors of the LED module 211a and the LED module 211c.

Furthermore, when the power switch switches at the third time, the controller 261 again outputs a high potential to the gate of the transistor M1 to turn on the transistor M1, and outputs a low potential to the gate of the transistor M2 to cut off the transistor M2, so that the LED module 211a and the LED module 211b light up, the LED module 211c extinguishes, and thus the light emitting color is also changed. Therefore, the light emitting apparatus 2k may have the multi-stage dimming (light emitting color, color temperature) technology, and can adjust the light emitting color or the color temperature of the light emitting unit 21 according to the number of switching operations of the power switch within the fixed time. Thus, the light emitting apparatus 2k can achieve the dimming (light emitting color, color temperature) effect without the indoor wiring being modified.

Figure 4A:
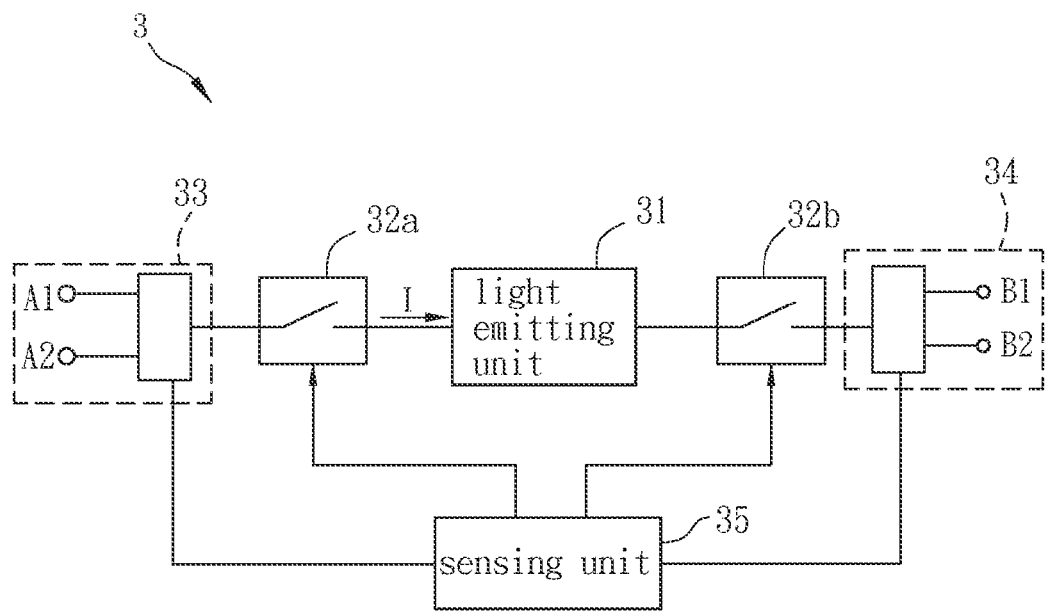
FIGS. 4A and 4B are schematic illustrations showing light emitting apparatuses according to another preferred embodiment of the invention.

FIG. 4A is a schematic illustration showing a light emitting apparatus 3 according to another preferred embodiment of the invention. Different from the light emitting apparatus 2 of FIG. 2A, the light emitting apparatus 3 of FIG. 4A has two switching units. In addition, one switching unit 32a is electrically connected with the first electrical connection element 33 and the light emitting unit 31, and the other switching unit 32b is electrically connected with the second electrical connection element 34 and the light emitting unit 31. Thus, the sensing unit 35 can sense whether the current flows through the first electrode A1 and the second electrode A2 of the first electrical connection element 33 and control the switching unit 32a. In addition, the sensing unit 35 may also sense whether the current flows through the first electrode B1 and the second electrode B2 of the second electrical connection element 34 and control the switching unit 32b. Thus, when the sensing unit 35 senses that the current flows through the first electrode A1 and the second electrode A2 of the first electrical connection element 33, and senses that the current flows through the first electrode B1 and the second electrode B2 of the second electrical connection element 34, it can control the switching units 32a and 32b to turn on and thus control the light emitting unit 31 to emit light.

Figure 4B:
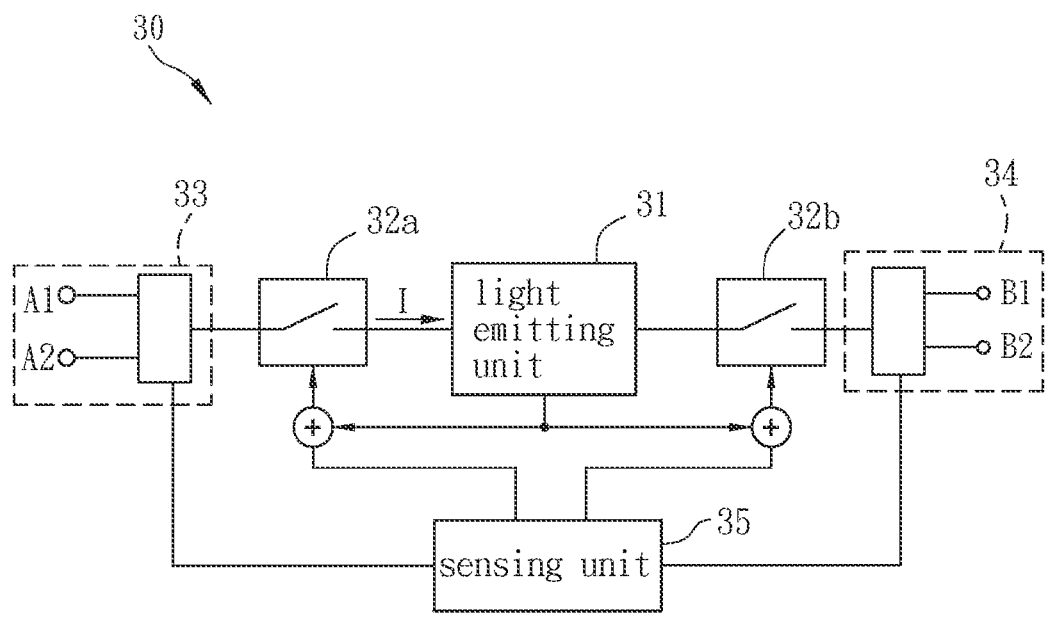

FIG. 4B is a schematic illustration showing a light emitting apparatus 30 according to another preferred embodiment of the invention. Different from the light emitting apparatus 3 of FIG. 4A, the switching units 32a and 32b and the light emitting unit 31 of FIG. 4B further form a self-latched loop, and a self-latched turning-on state can be kept after the light emitting unit 31 starts to emit light.

Figure 5A:
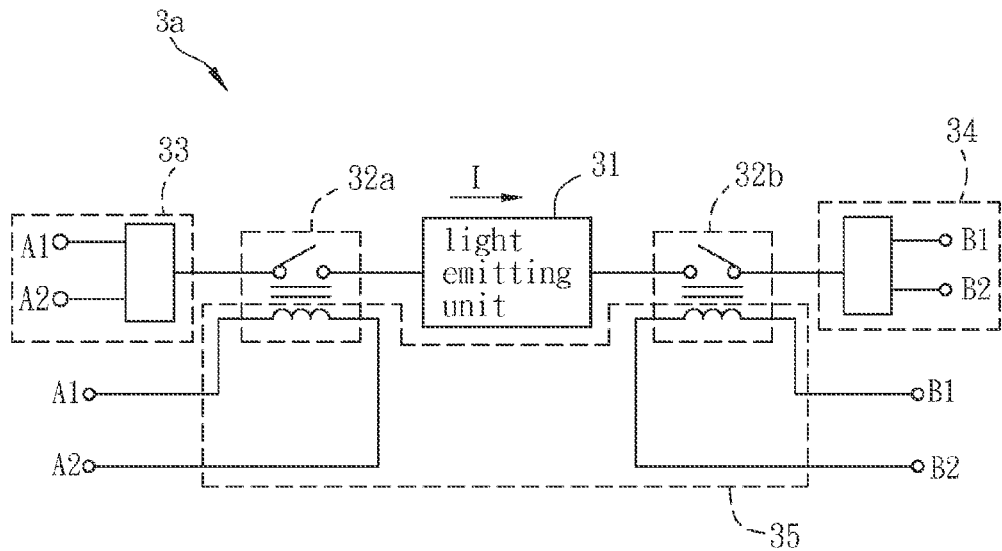
FIGS. 5A and 5B are schematic circuit diagrams showing light emitting apparatuses according to another preferred embodiment of the invention.
Figure 5B:
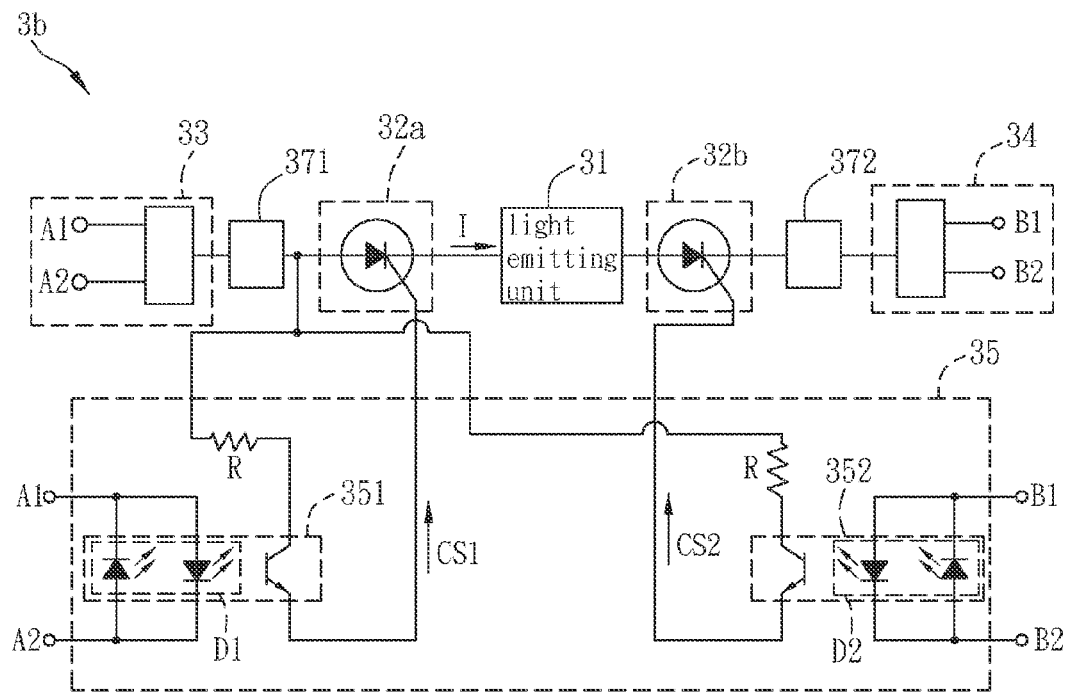

FIGS. 5A and 5B are schematic circuit diagrams showing light emitting apparatuses 3a and 3b according to another preferred embodiment of the invention.

As shown in FIG. 5A, each of the switching units 32a and 32b is a relay, and the sensing unit 35 may include the coil of the switching unit 32a and the coil of the switching unit 32b. Thus, when filament currents flow between the first electrode A1 and the second electrode A2 of the first electrical connection element 33 and between the first electrode B1 and the second electrode B2 of the second electrical connection element 34, it represents that the filament currents flow through the coil of the switching unit 32a and the coil of the switching unit 32b. Thus, the connection terminal of the switching unit 32a and the connection terminal of the switching unit 32b may be electrically connected with each other to light up the light emitting unit 31. Herein, the cascaded order between the switching units 32a and 32b and the light emitting unit 31 may be changed.

The circuit architecture of the light emitting apparatus 3b of FIG. 5B is substantially the same as the light emitting apparatus 2b except for the main difference that the light emitting apparatus 3b has two switching units 32a and 32b, that the switching unit 32a is electrically connected with the light emitting unit 31 and the rectifying element 371, and that the switching unit 32b is electrically connected with the light emitting unit 31 and the rectifying element 372. In addition, when the sensing element 351 senses the filament current flowing between the first electrode A1 and the second electrode A2 of the first electrical connection element 33, it can output the sensing signal CS1 to control the switching unit 32a to turn on. When the sensing element 352 senses the filament current flowing between the first electrode B1 and the second electrode B2 of the second electrical connection element 34, it can output the sensing signal CS2 to control the switching unit 32b to turn on and thus to control the light emitting unit 31 to emit light. Herein, the cascaded order between the switching units 32a and 32b and the light emitting unit 31 may be changed.

Figure 6A:
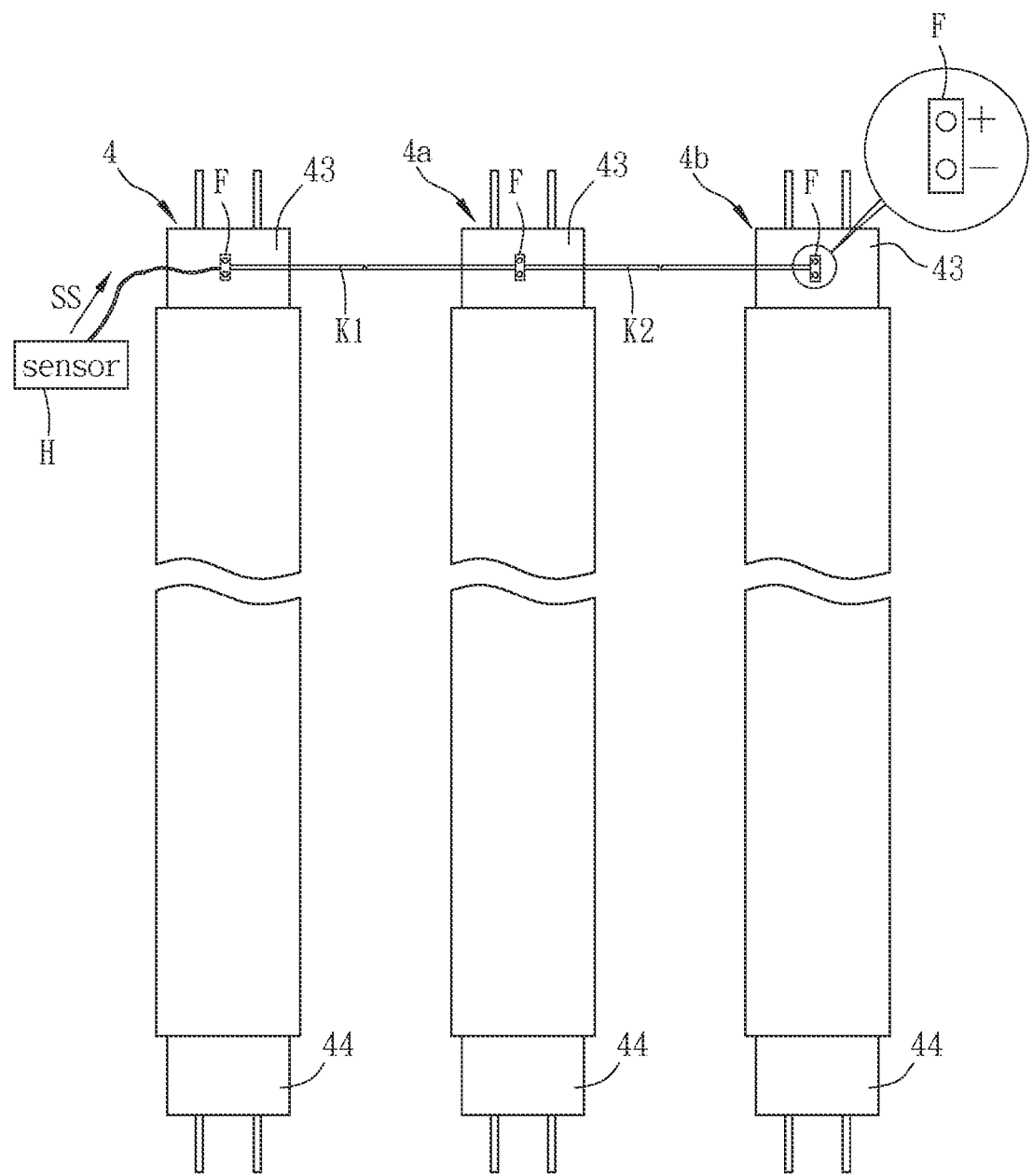
FIGS. 6A and 6B are schematic illustrations showing an application of the light emitting apparatus of the invention.

FIG. 6A is a schematic illustration showing an application of the light emitting apparatus of the invention. As shown in FIG. 6A, each of the light emitting apparatuses 4, 4a and 4b is, for example but without limitation thereto, a longitudinal lamp. Each of the light emitting apparatuses 4, 4a and 4b may have the element (e.g., the sensing unit, light emitting unit, switching unit) of each of the above-mentioned light emitting apparatuses 2, 2a to 2j, 3, 3a and 3b. In addition, each of the light emitting apparatuses 4, 4a and 4b may also have the control unit (not shown) of the light emitting apparatus 2h, 2i or 2j.

In addition, each of the light emitting apparatuses 4, 4a and 4b may further include a signal connection terminal F. Herein, the signal connection terminal F may be disposed on the electrical connection element (e.g., the first electrical connection element 43 in the drawing) of the light emitting apparatus 4/4a/4b, and may be connected with a signal receiver having an input terminal and an output terminal electrically insulated from each other. The signal connection terminal F can receive a control signal SS generated by a sensor H, and the control unit of the light emitting apparatus 4 can control its light emitting unit (not shown) to emit light according to the control signal SS. In addition, the control signal SS may be transferred to another light emitting apparatus through the signal connection terminal F. For example, the control signal SS is transferred from the light emitting apparatus 4 to the light emitting apparatus 4a through the wire K1, and then the control signal SS is transferred to the light emitting apparatus 4b through the wire K2. The control units of the light emitting apparatuses 4a and 4b may also control the lighting brightnesses of the light emitting units thereof according to the control signal SS, respectively.

Figure 6B:
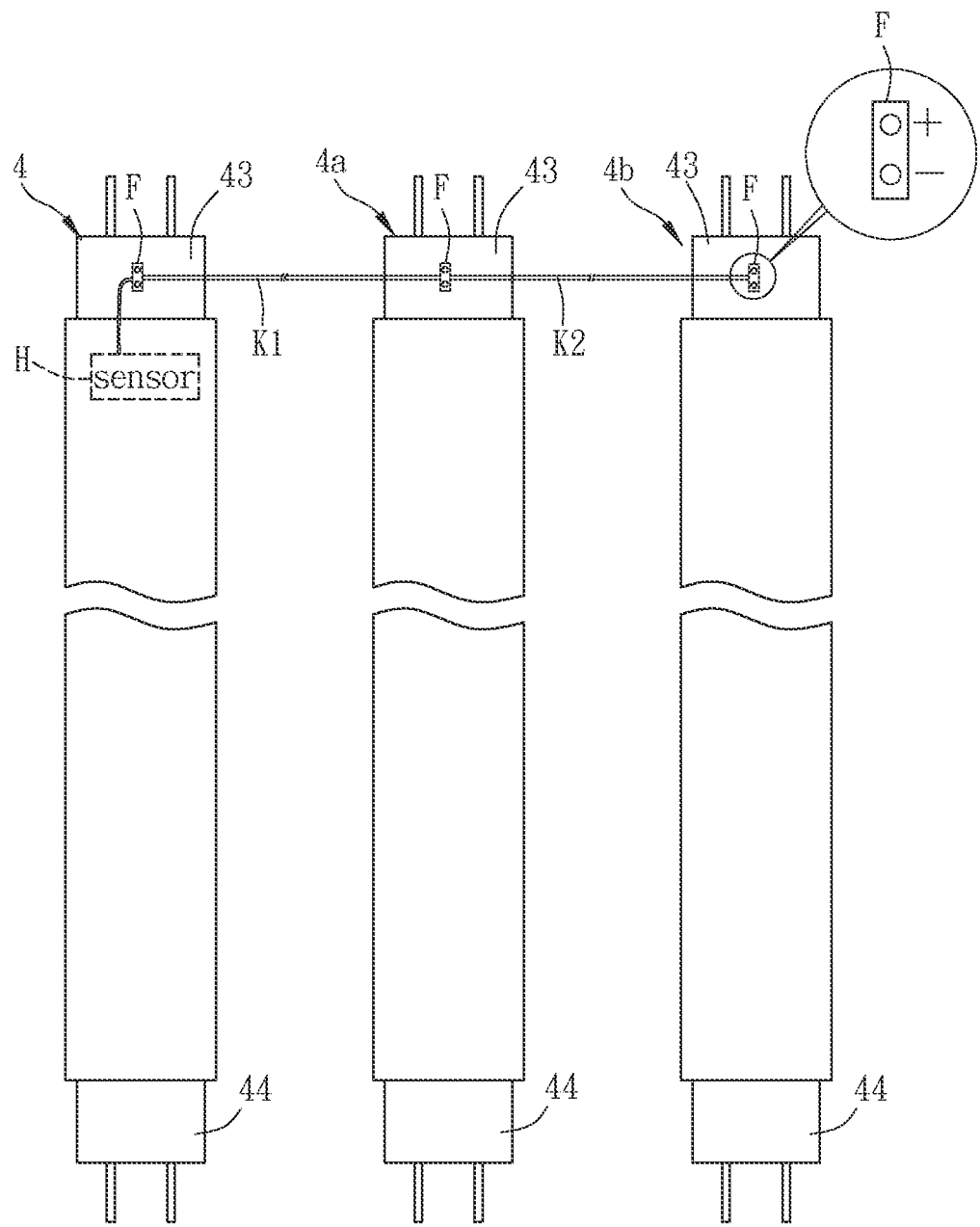

In this embodiment, the sensor H may be a radio sensor, an infrared sensor or an ultrasonic sensor. However, the invention is not particularly restricted thereto. The control signal SS may be a radio signal, an infrared signal or an ultrasonic signal. In addition, as shown in FIG. 6A, the sensor H may be disposed outside the light emitting apparatus 4, or may be disposed inside the light emitting apparatus 4, as shown in FIG. 6B. Herein, the invention is not particularly restricted to the position of the sensor H. In addition, the power required by the sensor may also be provided by either the light emitting apparatus 4 or any other external power.

For example, when the sensor H senses an object (e.g., human body) approaching it by a specific distance, the sensor H can output the control signal SS, which is inputted to the light emitting apparatus 4 from the signal connection terminal F through the wire. The control unit of the light emitting apparatus 4 can receive the control signal SS, and control the light emitting unit thereof to automatically increase the lighting brightness thereof (e.g., from the semi brightness to the full brightness) according to the control signal SS. The control signal SS may also be transferred to the light emitting apparatus 4a through the signal connection terminal F of the light emitting apparatus 4, and thus be transferred to another light emitting apparatus 4b to automatically increase the lighting brightnesses of the light emitting units of the light emitting apparatuses 4a and 4b, respectively.

Figure 6C:
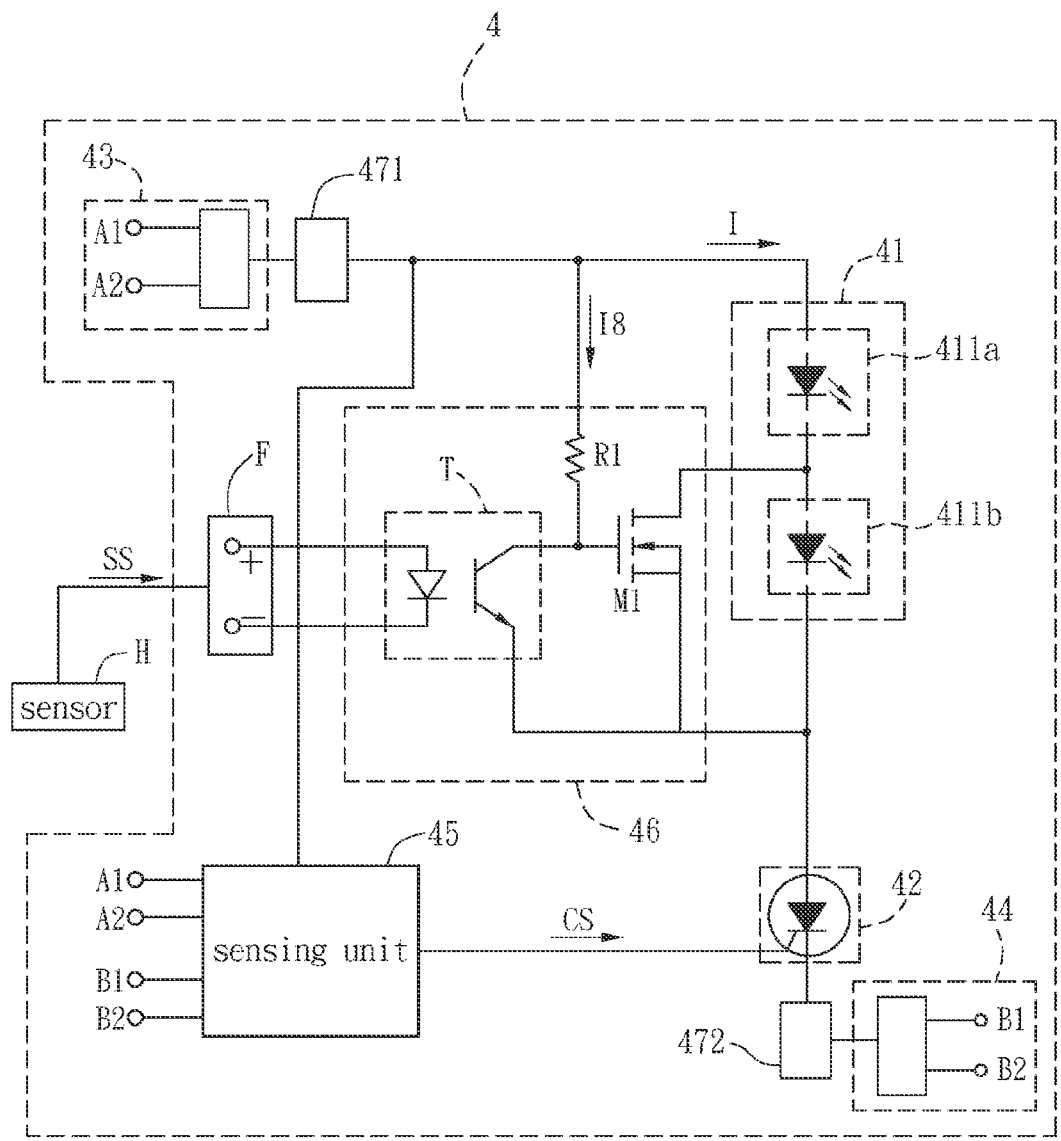
FIG. 6C is a schematic circuit connection diagram showing that a signal connection terminal is used to control a light emitting apparatus.

FIG. 6C is a schematic circuit connection diagram showing that a signal connection terminal F is used to control a light emitting apparatus 4. As shown in FIG. 6C, the control signal SS is coupled to the control unit 46 of the light emitting apparatus 4 through a signal receiver T. Herein, the signal receiver T is a photo coupler, and the signal connection terminal F is connected with the signal receiver T. The signal receiver T has the advantage that the input terminal and the output terminal are electrically insulated from each other.

In this embodiment, when the first electrical connection element 43 and the second electrical connection element 44 of the light emitting apparatus 4 are electrically connected with the external power, filament currents flow between the first electrode A1 and the second electrode A2 of the first electrical connection element 43 and between the first electrode B1 and the second electrode B2 of the second electrical connection element 44. So, the sensing unit 45 can output the sensing signal CS to the switching unit 42 (silicon-controlled rectifier) to turn on the switching unit 42. At this time, the gate of the transistor M1 has the high potential to turn on the transistor M1 (the control signal SS is not inputted to the signal receiver T at this time, so the signal receiver T does not turn on), so the LED module 411b of the light emitting unit 41 is bypassed and does not emit light. Thus, in the light emitting unit 41, the current I only flows through the LED module 411a without flowing through the LED module 411b, so that only the LED module 411a lights up and emits light.

When the sensor H senses the human body approaching the light emitting apparatus 4, the sensor H can output the control signal SS, which is coupled to the signal receiver T of the control unit 46 of the light emitting apparatus 4 through the signal connection terminal F, so that the signal receiver T turns on. Thus, the current I8 can flow through the signal receiver T and make the gate of the transistor M1 become the low potential. So, the transistor M1 is in the cut-off state so that the LED module 411b is not bypassed, and the current I can flow through the LED module 411a and the LED module 411b of the light emitting unit 41 to make the LED module 411a and the LED module 411b light up and emit light.

Thus, when the sensor H senses the human body approaching the light emitting apparatus 4, the sensor H can output the control signal SS, which is coupled to the control unit 46 of the light emitting apparatus 4 through the signal connection terminal F so that the lighting brightness of the light emitting unit 41 of the light emitting apparatus 4 can be automatically increased.

In addition, the other technological characteristics of the light emitting apparatus 4 can be found in the above-mentioned light emitting apparatus, so detailed descriptions thereof will be omitted.

In summary, the light emitting apparatus according to the invention utilizes the sensing unit to sense the filament currents flowing between two electrical input terminals of the first electrical connection element and between two electrical input terminals of the second electrical connection element, and then controls the switching unit to turn on and enable the light emitting unit to start to emit light. Thus, when the user only installs the first electrical connection element in the lamp holder, the sensing unit cannot turn on the switching unit, so the lamp current generated by the external power cannot flow through the lamp current path formed by the first electrical connection element, the light emitting unit and the second electrical connection element, and there is no risk of generating the electric shock when the user inadvertently touches the second electrical connection element. As a result, the light emitting apparatus of the invention is free from the risk of electric shock during installation.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A light emitting apparatus receiving an external power and comprising:
   a light emitting unit;
   at least one switching unit electrically connected with the light emitting unit to form a serial circuit;
   a first electrical connection element electrically connected with the external power and the light emitting unit;
   a second electrical connection element electrically connected with the external power and the switching unit; and
   a sensing unit electrically connected with the first electrical connection element, the second electrical connection element and the switching unit, wherein when filament currents flow between two electrical input terminals of the first electrical connection element and between two electrical input terminals of the second electrical connection element, the sensing unit controls the switching unit to turn on to enable the light emitting unit to receive the external power and start to emit light.

2. The light emitting apparatus according to claim 1, wherein when the switching unit does not turn on, a lamp current generated by the external power cannot flow through a lamp current path formed by the first electrical connection element, the light emitting unit and the second electrical connection element.

3. The light emitting apparatus according to claim 1, further comprising:
   a control unit, which is electrically connected with the light emitting unit and controls lighting brightnesses, colors, color temperatures, the number of lighting operations, or a lighting order of a plurality of light emitting diodes (LEDs) of the light emitting unit, or serial-parallel configurations of the LEDs.

4. The light emitting apparatus according to claim 3, wherein the control unit controls the lighting brightnesses, colors, color temperatures, the number of lighting operations, or the lighting order of the LEDs of the light emitting unit, or serial-parallel configurations of the LEDs according to the number of interruptions of the external power within a specific time.

5. The light emitting apparatus according to claim 3, wherein the control unit controls the lighting brightnesses, colors, color temperatures, the number of lighting operations, or the lighting order of the LEDs of the light emitting unit, or serial-parallel configurations of the LEDs according to a lamp current flowing through the light emitting unit.

6. The light emitting apparatus according to claim 1, further comprising:
   a control unit, which is electrically connected with the serial circuit and changes a serial connection impedance between the control unit and the light emitting unit according to a lamp current of the light emitting unit.

7. The light emitting apparatus according to claim 1, further comprising:
   at least one rectifying unit having an output terminal electrically connected with the serial circuit.

8. The light emitting apparatus according to claim 7, wherein the rectifying unit further has a first input terminal and a second input terminal, the first electrical connection element is electrically connected with the external power and the first input terminal, and the second electrical connection element is electrically connected with the external power and the second input terminal.

9. The light emitting apparatus according to claim 1, wherein the light emitting unit comprises at least one AC LED module.

10. The light emitting apparatus according to claim 1, wherein the switching unit comprises a relay, a transistor or a silicon-controlled rectifier.

11. The light emitting apparatus according to claim 1, wherein the sensing unit has two sensing elements, which sense whether there are filament currents flowing between the electrical input terminals of the first electrical connection element and between the electrical input terminals of the second electrical connection element, respectively.

12. The light emitting apparatus according to claim 1, wherein when the switching unit turns on to enable the light emitting unit to start to emit light, the switching unit can continuously keep turning on according to a lamp current, a crossover voltage or an emitted light of the light emitting unit, or a lamp current flowing through the switching unit.

13. The light emitting apparatus according to claim 1, further comprising:
   at least one impedance element electrically connected between the electrical input terminals of the first electrical connection element, or between the electrical input terminals of the second electrical connection element.

14. The light emitting apparatus according to claim 13, wherein when there are two impedance elements, one of the impedance elements is electrically connected between the electrical input terminals of the first electrical connection element, and the other one of the impedance elements is electrically connected between the electrical input terminals of the second electrical connection element.

15. The light emitting apparatus according to claim 1, wherein the electrical input terminals of the first electrical connection element and the second electrical connection element match with a lamp holder of a fluorescent lamp.

* * * * *